(12) United States Patent
Lin et al.

(10) Patent No.: US 11,375,518 B2
(45) Date of Patent: Jun. 28, 2022

(54) METHOD AND APPARATUS FOR MANAGING PDCCH PROCESSING TIMELINES

(71) Applicant: Samsung Electronics Co., Ltd., Suwon-si (KR)

(72) Inventors: Qiongjie Lin, Mountain View, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 16/747,388

(22) Filed: Jan. 20, 2020

(65) Prior Publication Data

US 2020/0236692 A1 Jul. 23, 2020

Related U.S. Application Data

(60) Provisional application No. 62/795,641, filed on Jan. 23, 2019, provisional application No. 62/800,868, (Continued)

(51) Int. Cl.
*H04W 72/12* (2009.01)
*H04L 5/00* (2006.01)
*H04W 72/04* (2009.01)
*H04W 76/28* (2018.01)
*H04L 1/00* (2006.01)

(52) U.S. Cl.
CPC ....... *H04W 72/1205* (2013.01); *H04L 1/0026* (2013.01); *H04L 5/0051* (2013.01); *H04L 5/0092* (2013.01); *H04L 5/0094* (2013.01); *H04W 72/042* (2013.01);
(Continued)

(58) Field of Classification Search
CPC .................................................. H04W 72/1205
See application file for complete search history.

(56) References Cited

U.S. PATENT DOCUMENTS

2017/0181219 A1 6/2017 Cesares Cano et al.
2019/0305867 A1* 10/2019 Tseng ................... H04J 11/0086
(Continued)

OTHER PUBLICATIONS

"5G; NR; Physical channels and modulation (3GPP TS 38.211 version 15.2.0 Release 15)", ETSI TS 138 211 V15.2.0, Jul. 2018, 98 pages.
(Continued)

*Primary Examiner* — Jason E Mattis

(57) ABSTRACT

A user equipment, a base station, and a method for managing scheduling offsets. The UE is configured to receive a configuration for a set of minimum scheduling offset values for a first cell and receive a physical downlink control channel (PDCCH) of a second cell that is same as or different than the first cell. The UE is also configured to decode a downlink control information (DCI) format that includes a field that indicates a minimum scheduling offset value applicable for a reception of a physical downlink shared channel (PDSCH) on an active DL BWP of the first cell, or for a transmission of a physical uplink shared channel (PUSCH) on an active UL BWP of the first cell. The UE is also configured to determine a delay and apply the minimum scheduling offset value in a second slot of the second cell that is separated from the first slot by the delay.

20 Claims, 13 Drawing Sheets

Related U.S. Application Data filed on Feb. 4, 2019, provisional application No. 62/884,978, filed on Aug. 9, 2019, provisional application No. 62/896,334, filed on Sep. 5, 2019, provisional application No. 62/909,108, filed on Oct. 1, 2019, provisional application No. 62/910,852, filed on Oct. 4, 2019, provisional application No. 62/937,945, filed on Nov. 20, 2019.

(52) U.S. Cl.
 CPC ... *H04W 72/0446* (2013.01); *H04W 72/1257* (2013.01); *H04W 76/28* (2018.02)

(56) References Cited

U.S. PATENT DOCUMENTS

| | | | |
|---|---|---|---|
| 2020/0107345 A1* | 4/2020 | Ang | H04W 72/1257 |
| 2020/0229098 A1* | 7/2020 | Cheng | H04W 72/042 |
| 2020/0267643 A1* | 8/2020 | Wu | H04L 5/0053 |
| 2020/0351926 A1* | 11/2020 | Bagheri | H04W 72/1289 |
| 2021/0136808 A1* | 5/2021 | Yang | H04W 72/1205 |

OTHER PUBLICATIONS

"5G; NR; Multiplexing and channel coding (3GPP TS 38.212 version 15.2.0 Release 15)", ETSI TS 138 212 V15.2.0, Jul. 2018, 101 pages.
"5G; NR; Physical layer procedures for control (3GPP TS 38.213 version 15.2.0 Release 15)", ETSI TS 138 213 V15.2.0, Jul. 2018, 101 pages.
"5G; NR; Physical layer procedures for data (3GPP TS 38.214 version 15.2.0 Release 15)", ETSI TS 138 214 V15.2.0, Jul. 2018, 95 pages.
"5G; NR; Physical layer measurements (3GPP TS 38.215 version 15.2.0 Release 15)", ETSI TS 138 215 V15.2.0, Jul. 2018, 18 pages.
"3rd Generation Partnership Project, Technical Specification Group Radio Access Network; NR; Radio Resource Control (RRC) protocol specification (Release 15)", 3GPP TS 38.331 V15.2.0, Jun. 2018, 304 pages.
"5G; NR; Medium Access Control (MAC) protocol specification (3GPP TS 38.321 version 15.2.0 Release 15)", ETSI TS 138 321 V15.2.0, Sep. 2018, 74 pages.
International Search Report in connection with International Application No. PCT/KR2020/001158 dated Apr. 28, 2020, 3 pages.
ASUSTek, "PDSCH resource allocation restriction for power saving," R1-1900818, 3GPP TSG RAN WG1 Ad-Hoc Meeting 1901, Taipei, Taiwan, Jan. 21-25, 2019, 3 pages.
Ericsson, "Adaptation aspects of NR UE power saving," Tdoc R1-1901166, 3GPP TSG-RAN WG1 Ad-Hoc Meeting 1901, Taipei, Taiwan, Jan. 21-25, 2019, 8 pages.
Nokia, et al., "On UE adaptation to the traffic," R1-1901188, 3GPP TSG RAN WG1 Ad-Hoc Meeting 1901, Taipei, Taiwan, Jan. 21-25, 2018, 12 pages.
Qualcomm Incorporation, "UE Adaptation to the Traffic and UE Power Consumption Characteristics," R1-1900911, 3GPP TSG-RAN WG1 Ad-Hoc Meeting 1901, Taipei, Taiwan, Jan. 21-25, 2019, 24 pages.
Supplementary European Search Report dated Oct. 26, 2021, in connection with European Application No. 20745470.3, 8 pages.

* cited by examiner

METHOD AND APPARATUS FOR MANAGING PDCCH PROCESSING TIMELINES

CROSS-REFERENCE TO RELATED APPLICATION AND CLAIM OF PRIORITY

This application claims priority under 35 U.S.C. § 119(e) to U.S. Provisional Patent Application No. 62/795,641 filed on Jan. 23, 2019; to U.S. Provisional Patent Application No. 62/800,868 filed on Feb. 4, 2019; to U.S. Provisional Patent Application No. 62/884,978 filed on Aug. 9, 2019; to U.S. Provisional Patent Application No. 62/896,334 filed on Sep. 5, 2019; to U.S. Provisional Patent Application No. 62/909,108 filed on Oct. 1, 2019; to U.S. Provisional Patent Application No. 62/910,852 filed on Oct. 4, 2019; and to U.S. Provisional Patent Application No. 62/937,945 filed on Nov. 20, 2019. The above-identified provisional patent applications are hereby incorporated by reference in its entirety.

TECHNICAL FIELD

The present disclosure relates to a pre-5$^{th}$-Generation (5G) or 5G communication system to be provided for supporting higher data rates Beyond 4$^{th}$-Generation (4G) communication system such as Long-Term Evolution (LTE). More particularly, the present disclosure is directed to managing PDCCH processing timelines.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Embodiments of the present disclosure include a user equipment (UE), a base station, and a method for managing scheduling offsets. One embodiment is directed to a UE that includes a transceiver configured to receive a configuration for one of (i) a first set of minimum scheduling offset values for an active downlink bandwidth part (DL BWP) of a first cell, or (ii) a second set of minimum scheduling offset values for an active uplink bandwidth part (UL BWP) of the first cell. The transceiver is also configured to receive a physical downlink control channel (PDCCH) in a first slot on an active DL BWP of a second cell that is same as or different than the first cell. The UE also includes a processor, operably connected to the transceiver, the processor configured to decode a downlink control information (DCI) format provided by the PDCCH. The DCI format includes a field that indicates a minimum scheduling offset value. The minimum schedule offset value can be from the first set and is applicable for a reception of a physical downlink shared channel (PDSCH) on the active DL BWP of the first cell, or the minimum scheduling offset value can be from the second set and is applicable for a transmission of a physical uplink shared channel (PUSCH) on the active UL BWP of the first cell. The processor is also configured to determine a delay based on a current minimum scheduling offset value, a subcarrier spacing (SCS) configuration for the active DL BWP of the first cell, and a SCS configuration for the active DL BWP of the second cell; and apply the minimum scheduling offset value in a second slot of the second cell that is separated from the first slot by the delay.

Another embodiment is directed to a base station that includes a processor configured to generate a configuration for one of (i) a first set of minimum scheduling offset values for an active downlink bandwidth part (DL BWP) of a first cell, or (ii) a second set of minimum scheduling offset values for an active uplink bandwidth part (UL BWP) of the first cell. The processor is also configured to generate a downlink control information (DCI) format; wherein: (i) the DCI format includes a field that indicates a minimum scheduling offset value; and (ii) the minimum scheduling offset value is from the first set and is applicable for a transmission of a physical downlink shared channel (PDSCH) on the active DL BWP of the first cell, or the minimum scheduling offset value is from the second set and is applicable for a reception of a physical uplink shared channel (PUSCH) on the active UL BWP of the first cell. The base station also includes a transceiver operably connected to the processor, the transmitter configured to transmit the configuration and the DCI format in a physical downlink control channel (PDCCH) in a first slot on an active DL BWP of a second cell that is same as or different than the first cell. The minimum scheduling offset value is applied in a second slot of the second cell that is separated from the first slot by a delay, and wherein the delay is based on a current minimum scheduling offset value, a subcarrier spacing (SCS) configuration for the active DL BWP of the first cell, and a SCS configuration for the active DL BWP of the second cell.

Yet another embodiment is directed to a method for managing scheduling offsets. The method includes receiving a configuration for one of a first set of minimum scheduling offset values for an active downlink bandwidth part (DL BWP) of a first cell, or a second set of minimum scheduling offset values for an active uplink bandwidth part (UL BWP) of the first cell. The method also includes receiving a physical downlink control channel (PDCCH) in a first slot on an active DL BWP of a second cell that is same as or different than the first cell, and decoding a downlink control information (DCI) format provided by the PDCCH. The DCI format includes a field that indicates a minimum scheduling offset value. The minimum scheduling offset value can be from the first set and is applicable for a reception of a physical downlink shared channel (PDSCH) on the active DL BWP of the first cell, or the minimum scheduling offset value can be from the second set and is applicable for a transmission of a physical uplink shared channel (PUSCH) on the active UL BWP of the first cell. The method also includes determining a delay based on a current minimum scheduling offset value, a subcarrier spacing (SCS) configuration for the active DL BWP of the first cell, and a SCS configuration for the active DL BWP of the second cell; and applying the minimum scheduling offset value in a second slot of the second cell that is separated from the first slot by the delay.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The following documents are hereby incorporated by reference into the present disclosure as if fully set forth herein: 3GPP TS 38.211 v15.2.0, "NR; Physical channels and modulation", hereinafter "REF 1"; 3GPP TS 38.212 v15.2.0, "NR; Multiplexing and channel coding", hereinafter "REF 2"; 3GPP TS 38.213 v15.2.0, "NR; Physical layer procedures for control", hereinafter "REF 3"; 3GPP TS 38.214 v15.2.0, "NR; Physical layer procedures for data", hereinafter "REF 4"; 3GPP TS 38.215 v15.2.0, "NR; Physical layer measurements", hereinafter "REF 5"; 3GPP TS 38.331 v15.2.0, "NR; Radio Resource Control (RRC) protocol specification", hereinafter "REF 6"; and 3GPP TS 38.321 v15.2.0, "NR; Medium Access Control (MAC) protocol specification", hereinafter "REF 7".

UE power consumption is a critical issue in all generations of wireless communications and has become even more important for 5G new radio (NR). NR supports several new features, including wider bandwidth operation, mandatory use of four receiver antennas in several frequency bands, operation in mmWave bands, shorter transmission time interval (TTI) durations, fewer always-on reference signal (RS) transmissions from a network, and increased connectivity. These features and others have led to increased UE power consumption. Additionally, dynamic traffic characteristics due to the multiple services that may be supported by a NR UE, such as enhanced Mobile Broad-Band (eMBB), massive Machine Type Communications (mMTC), and Ultra-Reliable and Low Latency Communications (URLLC), also make UE power savings a challenging yet essential objective. Since advances in battery technology have been modest, UE power efficiency has become a critical issue to the user experience and may even influence the level of success for 5G in the market.

As will be discussed in more detail below, novel aspects of this disclosure address the foregoing issues by dynamic adaptation of one or more configurations related to search space sets, including the increase/decrease of PDCCH monitoring periodicity and/or duration. Other novel aspects of this disclosure address UE power consumption by dynamic adaptation of a number of PDCCH candidates, dynamic adaptation of a minimum applicable scheduling delay offset, and by transitioning a UE between a "dormancy" and "non-dormancy" behaviors.

Figure 1:
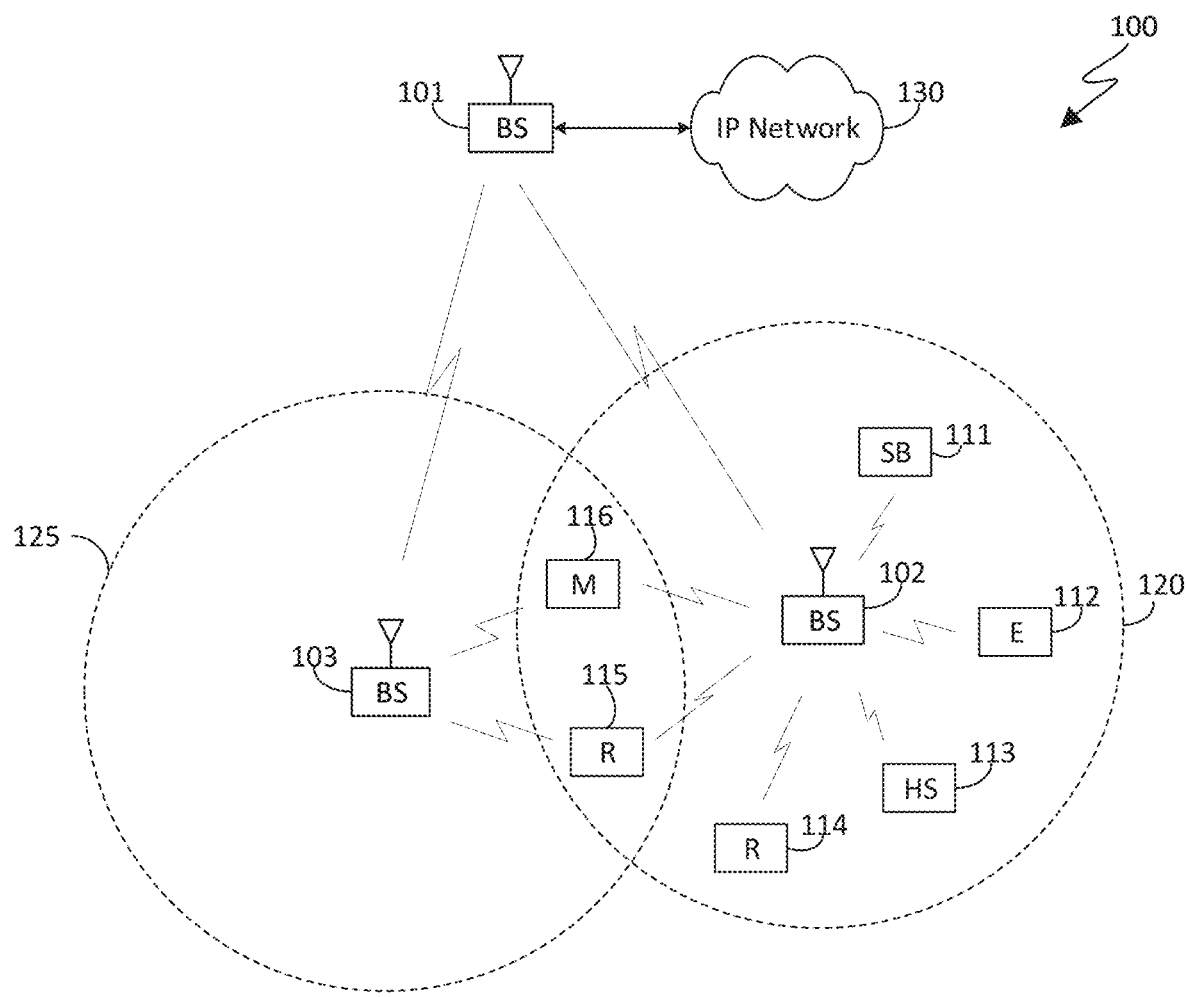
FIG. 1 illustrates an exemplary networked computing system according to various embodiments of this disclosure.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, wireless network 100 can be a 5G communication system in which a UE, such as UE 116, can manage PDCCH monitoring occasions according to one or more of the novel embodiments disclosed herein to improve UE power consumption, e.g., by dynamic adaptation of one or more configurations related to search space sets, dynamic adaptation of a number of PDCCH candidates, dynamic adaptation of a minimum applicable scheduling delay offset, and by transitioning a UE between a "dormancy" and "non-dormancy" behaviors. In some embodiments, management of UE power consumption involves communication of adaptation criteria and adaptation rules between a gNB, such as gNB 102 and a UE.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
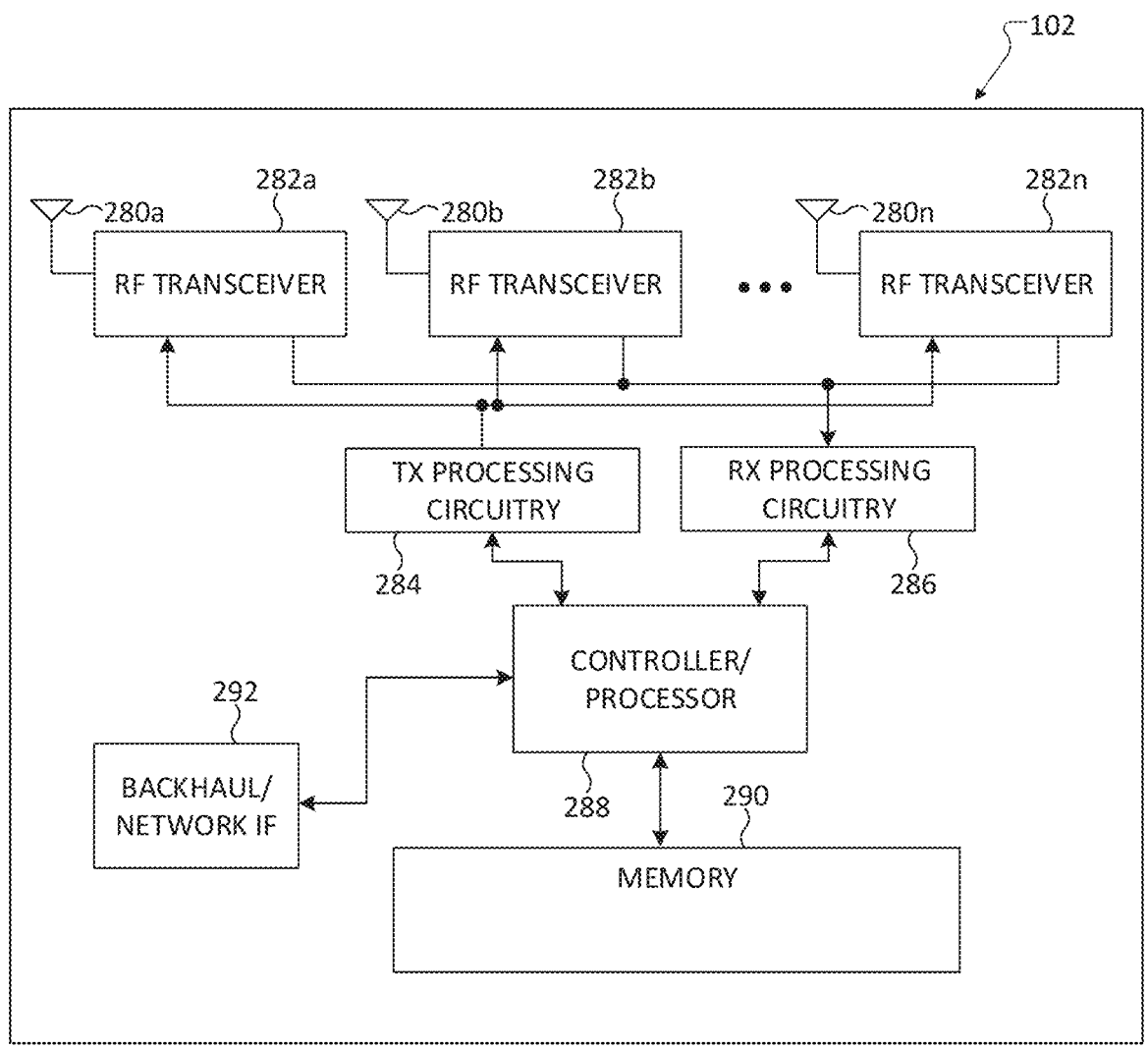
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, in some embodiments, management of UE power consumption involves communication of adaptation criteria and adaptation rules between a gNB, such as gNB 102 and a UE. These adaptation criteria and adaptation rules can be configured by the gNB.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
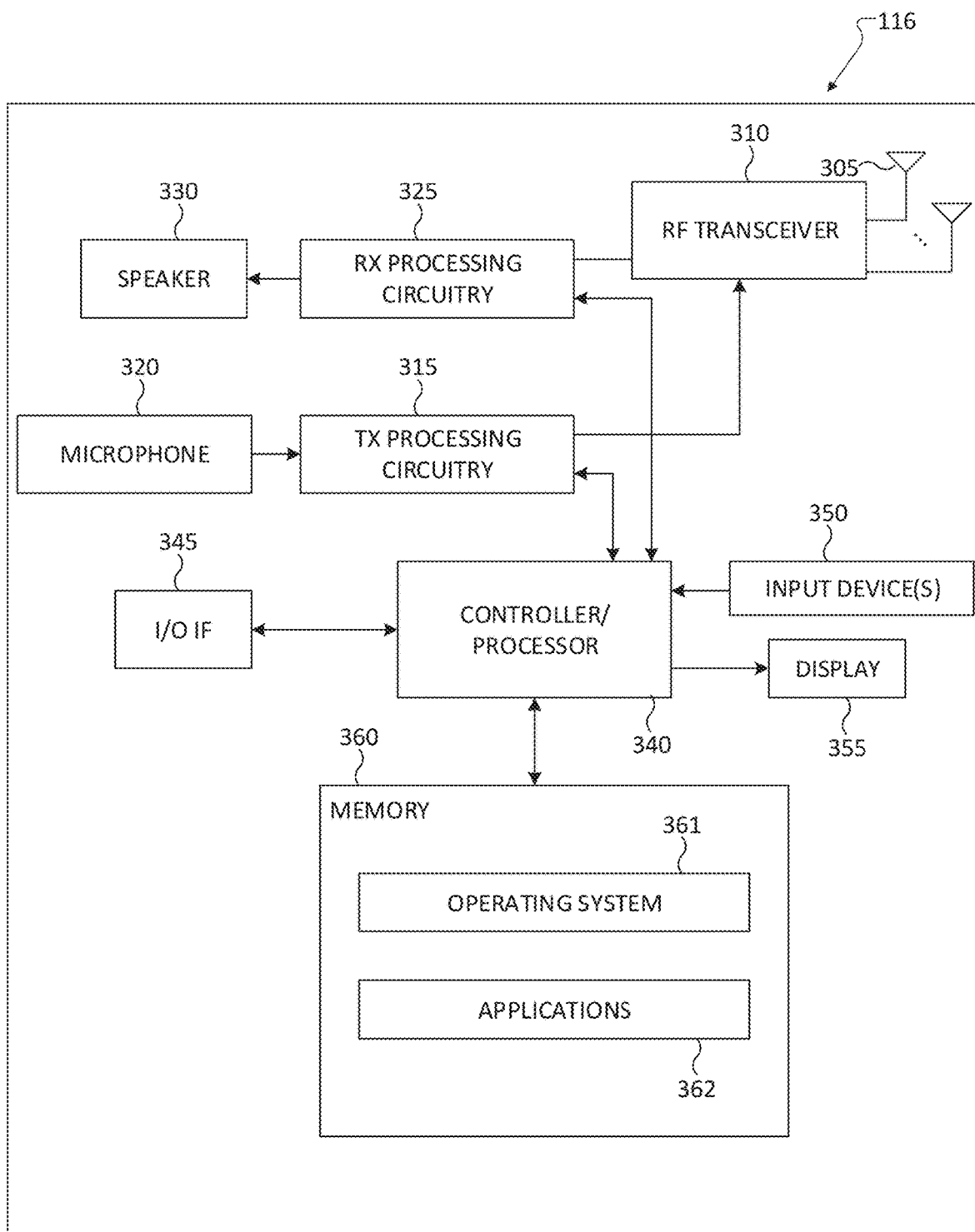
FIG. 3 illustrates an exemplary user equipment (UE) in the networked computing system according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, a UE, such as UE 116, can manage PDCCH monitoring occasions according to one or more of the novel embodiments disclosed herein to improve UE power consumption, e.g., by dynamic adaptation of one or more configurations related to search space sets, dynamic adaptation of a number of PDCCH candidates, dynamic adaptation of a minimum applicable scheduling delay offset, and by transitioning a UE between a "dormancy" and "non-dormancy" behaviors.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
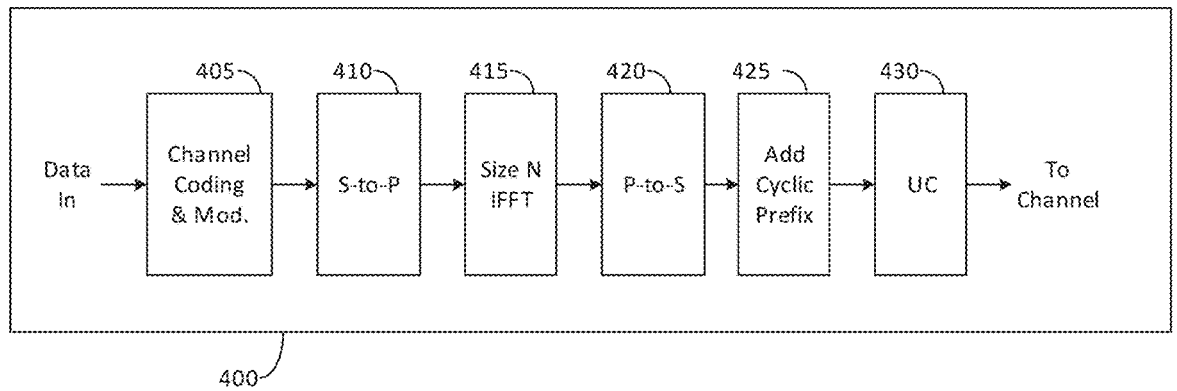
FIGS. 4A and 4B illustrate exemplary wireless transmit and receive paths according to various embodiments of this disclosure.
Figure 4B:
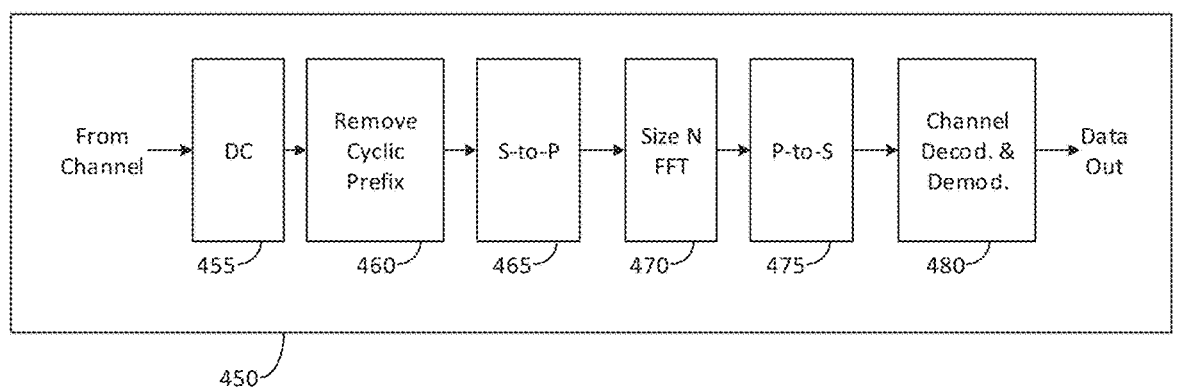

FIGS. 4A and 4B illustrate exemplary wireless transmit and receive paths according to various embodiments of this disclosure. In the following description, a transmit path 400 may be described as being implemented in an gNB (such as gNB 102), while a receive path 450 may be described as being implemented in a UE (such as UE 116). However, it will be understood that the receive path 450 could be implemented in an gNB and that the transmit path 400 could be implemented in a UE. In some embodiments, the transmit path 400 and receive path 450 are configured to support transmissions between a gNB and a UE in 5G NR communication system for managing UE power consumption, e.g., of adaptation criteria, adaptation rules, adaptation parameters, CSI etc.

The transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a serial-to-parallel (S-to-P) block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths, various changes may be made to FIGS. 4A and 4B. For example, various components in FIGS. 4A and 4B could be combined, further subdivided, or omitted and additional components could be added according to particular needs. Also, FIGS. 4A and 4B are meant to illustrate examples of the types of transmit and receive paths that could be used in a wireless network. Any other suitable architectures could be used to support wireless communications in a wireless network.

To better understand the discussion of various embodiments for managing UE power consumption described herein, the following discussion of Radio Resource Control (RRC) is provided. RRC state provides a UE with access, power savings, and mobility optimization. Apart from the RRC states of RRC_CONNECTED and RRC IDLE, which are already supported in 4G long-term evolution (LTE), NR introduces an additional RRC state, RRC_INACTIVE, to adjust to different service characteristics. The characteristics of the supported RRC states are summarized in Table 1 (see also REF 6).

TABLE 1

RRC_IDLE
PLMN selection;
Broadcast of system information;
Cell re-selection mobility;
Paging for mobile terminated data is initiated by 5GC;
Paging for mobile terminated data area is managed by 5GC;
DRX for CN paging configured by NAS.
RRC_INACTIVE
Broadcast of system information;
Cell re-selection mobility;
Paging is initiated by NG-RAN (RAN paging);
RAN-based notification area (RNA) is managed by NG- RAN;
DRX for RAN paging configured by NG-RAN;
5GC - NG-RAN connection (both C/U-planes) is established for UE;
The UE AS context is stored in NG-RAN and the UE;
NG-RAN knows the RNA which the UE belongs to.
RRC_CONNECTED
5GC - NG-RAN connection (both C/U-planes) is established for UE;
The UE AS context is stored in NG-RAN and the UE;
NG-RAN knows the cell which the UE belongs to;
Transfer of unicast data to/from the UE;
Network controlled mobility including measurements.

Advanced features for RRC CONNECTED state in NR Rel-15 are summarized as follows:
  Wide Bandwidth
  The system bandwidth (BW) for LTE is up to 20 MHz, while a carrier component bandwidth for NR is up to 100 MHz for carrier frequencies below 6 GHz (FR1) and up to 400 MHz for carrier frequencies above 6 GHz and below 52.6 GHz (FR2). Operation with bandwidth parts (BWPs) can enable a UE to use a BWP with narrower BW than the system BW when the UE is inactive, thereby enabling UE power savings. NR supports BWP switching based on RRC reconfiguration or based on an indication by a downlink control information (DCI) format conveyed by a physical downlink control channel (PDCCH) as described in REF 3 and REF 6. Cross-BWP scheduling can apply for PDCCH based BWP switching.

Frequent Control/Data Monitoring
  NR supports more frequent control/data monitoring than LTE. For example, when a 30 kHz subcarrier spacing (SCS) is used in NR, the UE complexity and power consumption for slot level monitoring of a same/similar number of PDCCH candidates is doubled compared to LTE. The issue becomes more severe when a UE is configured multiple PDCCH monitoring occasions within a slot such as when the UE needs to support low latency services. The PDCCH monitoring periodicity is configured by RRC together with other PDCCH monitoring parameters. Such configuration is not optimal for burst traffic arrivals as it is typically the case for mobile broadband or for low latency services. Reducing PDCCH monitoring according to instantaneous traffic characteristics and enhancing discontinuous reception (DRX) are design objectives for UE power savings.

Cross-slot scheduling or multi-slot scheduling can also be considered to reduce UE power as a single PDCCH can provide a UE with scheduling information for physical downlink shared channel (PDSCH) receptions over multiple slots without the UE having to perform full PDCCH monitoring during most or all of the multiple slots. The terminology PDCCH monitoring refers to a reception of a potential PDCCH (PDCCH candidate) by a UE and a decoding of a DCI format that is included in the PDCCH candidate as described in REF 3.

For some popular services such as web browsing, a UE typically monitors PDCCH without having a valid scheduling assignment for PDSCH reception or physical uplink shared channel (PUSCH) transmission. PDCCH-only monitoring without data can consume a large portion of UE power for digital baseband processing, such as 40%-60% depending on the service. Compared with radio frequency (RF) operation, baseband operation is somewhat more power consuming with the largest component for power consumption being the PDCCH monitoring. To reduce unnecessary PDCCH monitoring, candidate solutions include increasing a PDCCH monitoring periodicity, adaptive DRX procedures according to traffic patterns, wake-up/go-to-sleep signals/channels for connected mode DRX (C-DRX), and others.

For each downlink (DL) BWP configured to a UE in a serving cell, a UE can be provided a number of control resource sets by higher layers. For each control resource set, the UE is provided (see also REF 3 and REF 6): a control resource set index p; a demodulation reference signal (DM-RS) scrambling sequence initialization value; a precoder granularity for a number of resource element groups (REGs) in frequency where the UE can assume use of a same DM-RS precoder; a number of consecutive symbols; a set of resource blocks; control channel element to resource element groups (CCE-to-REG) mapping parameters; an antenna port quasi co-location (QCL), from a set of antenna port quasi co-locations, indicating quasi co-location information of the DM-RS antenna port for PDCCH reception; and an indication for a presence or absence of a transmission configuration indication (TCI) field for DCI format 1_1 transmitted by a PDCCH in control resource set p.

For each DL BWP configured to a UE in a serving cell, the UE is provided by higher layers with a number of search space sets where, for each search space set from the number search space sets, the UE is provided the following (see also REF 3): a search space set index $s$; an association between the search space set $s$ and a control resource set p; a PDCCH monitoring periodicity of $k_s$ slots and a PDCCH monitoring offset of $o_s$ slots; a PDCCH monitoring pattern within a slot, indicating first symbol(s) of the control resource set within a slot for PDCCH monitoring; a number of PDCCH candidates $M_s^{(L)}$ per CCE aggregation level L; and an indication that search space set $s$ is either a common search space set or a UE-specific search space set.

DC/CA Operation

From a UE perspective, any dual connectivity/carrier aggregation (DC/CA) operation consumes more power than a non-DC/non-CA operation. In CA, a traffic pattern on a secondary cell (SCell) is sparser than on a primary cell (PCell) where the UE maintains a RRC connection with a base station (gNB) since the SCell is mainly used when there are large data packets for the UE to exchange with the gNB. Since a SCell requires several milliseconds to activate by higher layers, the SCell typically remains activated even when there is no data to be transmitted to the UE in order for the gNB to have fast access to the UE on the SCell when data arrives. Therefore, while a gNB does not have a benefit in deactivating a SCell for a UE, the UE will perform redundant PDCCH monitoring for the SCell and unnecessarily consume power. Solutions need to be considered to enhance the power efficiency for DC/CA operation, for example, dynamic carrier management in DC/CA, DRX enhancements in DC/CA, etc.

Increased Number of Receiving and Transmitting Antennas

In NR, for some frequency bands, it is mandatory for a UE to be equipped with 4 receiver antenna ports. Power consumption for receptions with 4 receiver antenna ports is larger than for reception with 2 receiver antenna ports. In several operating scenarios, such as for example when a UE has highly favorable link conditions and a certain performance reliability target such as a block error rate (BLER) can be achieved with both 2 and 4 receiver antenna ports, it is preferable for the UE to use 2 receiver antenna ports to reduce power consumption. A similar behavior can also apply for transmissions from the UE with 2 or 4 transmitter antenna ports. Dynamic UE transmitter/receiver antenna port adaptation can be considered to reduce UE power consumption.

NR employs different antenna solutions and techniques depending on the part of the spectrum used for operation. For lower carrier frequencies, such as below 6 GHz, a low to moderate number of active antennas (up to around 32 transmitter chains) is typically used by a gNB transmitter. Acquisition of channel state information (CSI) by a gNB requires transmission of channel state information reference signal (CSI-RS) by the gNB and CSI reporting by the UE. The limited bandwidth available for operation in this frequency region requires high spectral efficiency that can be enabled by multi-user MIMO (MU-MIMO) and higher order spatial multiplexing that is achieved via higher resolution CSI reporting compared with LTE as described in REF 4.

C-DRX

Instead of always monitoring PDCCH, a UE can perform DRX in the RRC CONNECTED state (C-DRX). An illustration of a configuration of a C-DRX and an associated UE processing is provided in FIG. 5 that follows and as described in REF 7.

Figure 5:
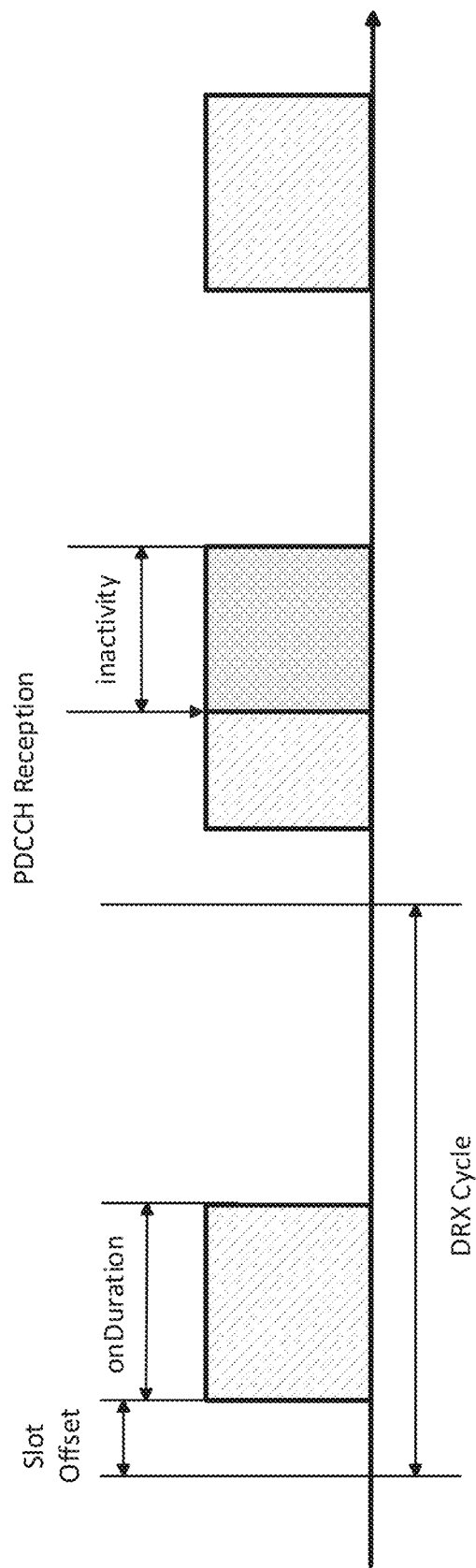
FIG. 5 illustrates a C-DRX configuration for a UE in accordance with various embodiments of this disclosure.

FIG. 5 illustrates a C-DRX configuration for a UE in accordance with various embodiments of this disclosure. To reduce power consumption, a UE monitors a paging message in a common search space (CSS) set during Active Time when either onDurationTimer or inactivityTimer is not expired.

There is a tradeoff between latency and UE power consumption overhead on a C-DRX configuration. For example, a UE would consume less power for a longer DRX cycle or inactivity timer but would also experience longer latency. NR Rel-15 supports reconfiguration for all associated DRX parameters from a predefined set of values using higher layer signaling. However, for the benefit of network flexibility, the UE-specific configuration tends to be unchanged over long time regardless of overall UE power consumption status, such as BWP bandwidth and activated number of component carriers (CCs)/cells. The associated configuration parameters are as follows:

drx-onDurationTimer: the duration at the beginning of a DRX cycle;

drx-SlotOffset: the delay in slots before starting the drx-onDurationTimer;

drx-InactivityTimer: the duration after the PDCCH occasion in which a PDCCH indicates an initial UL or DL user data transmission for the medium access control (MAC) entity;

drx-RetransmissionTimerDL (per DL hybrid automatic repeat request (HARM) process): the maximum duration until a DL retransmission is received;

drx-RetransmissionTimerUL (per UL HARQ process): the maximum duration until a grant for UL retransmission is received;

drx-LongCycle: the long DRX cycle;

drx-ShortCycle (optional): the short DRX cycle;

drx-ShortCycleTimer (optional): the duration the UE shall follow the short DRX cycle;

drx-HARQ-RTT-TimerDL (per DL HARQ process): the minimum duration before a DL assignment for HARQ retransmission is expected by the MAC entity; and drx-HARQ-RTT-TimerUL (per UL HARQ process): the minimum duration before a UL HARQ retransmission grant is expected by the MAC entity.

NR supports flexible timing for time domain resource allocation. An associated processing timing is defined as follows according to REF 4:

K0: timing between PDCCH reception and corresponding PDSCH reception is indicated from a set of values by a field in the DCI format scheduling the PDSCH reception. The set of values is provided by higher layers;

K2: timing between PDCCH reception and corresponding PUSCH transmission is indicated from a set of values by a field in the DCI format scheduling the PUSCH transmission. The set of values is provided by higher layers; and K1: timing between PDSCH reception and transmission of corresponding HARQ-ACK information is indicated from a set of values by a field in the DCI format scheduling the PDSCH reception. The set of values is provided by higher layers.

A UE supports a set of minimum values for a HARQ processing time. The HARQ processing time includes a delay between PDSCH reception timing and corresponding HARQ-ACK information transmission timing, and a delay between PDCCH reception timing and corresponding PUSCH transmission timing. The UE indicates its capability for a minimum HARQ processing time to a serving gNB.

Unlike LTE where a UE has fixed PDCCH monitoring occasions, NR supports duty-cycle based PDCCH monitoring with configurable PDCCH candidates and configurable monitoring periodicity and duration per search space set. However, reconfiguration of parameters for search spaces sets is by RRC signaling and therefore has limited applicability for adapting to dynamic traffic patterns. When the buffer status or the channel conditions for a UE change, it can be beneficial to either increase or decrease PDCCH monitoring frequency (including skipping PDCCH monitoring). A same consideration applies when SCells are activated or deactivated as such activity is linked to a data buffer size and a likelihood of PDCCH transmissions to the UE for scheduling PDSCH receptions or PUSCH transmissions from the UE. Both can have an impact on UE power consumption either by increasing PDCCH monitoring to reduce a time required to complete a session (e.g. buffer increases or channel conditions improve) or by decreasing (including skipping) PDCCH monitoring (e.g. buffer is empty or channel conditions deteriorate and UE may not be scheduled at least in some search space sets).

Therefore, it is beneficial to develop mechanisms and associated signaling support for dynamic adaptation of search space set configurations while considering a tradeoff between potential UE power saving gains and a scheduling latency. There is another need to support relaxation on PDCCH processing timeline through dynamic adaptation on minimum applicable scheduling delay offset.

Figure 6:
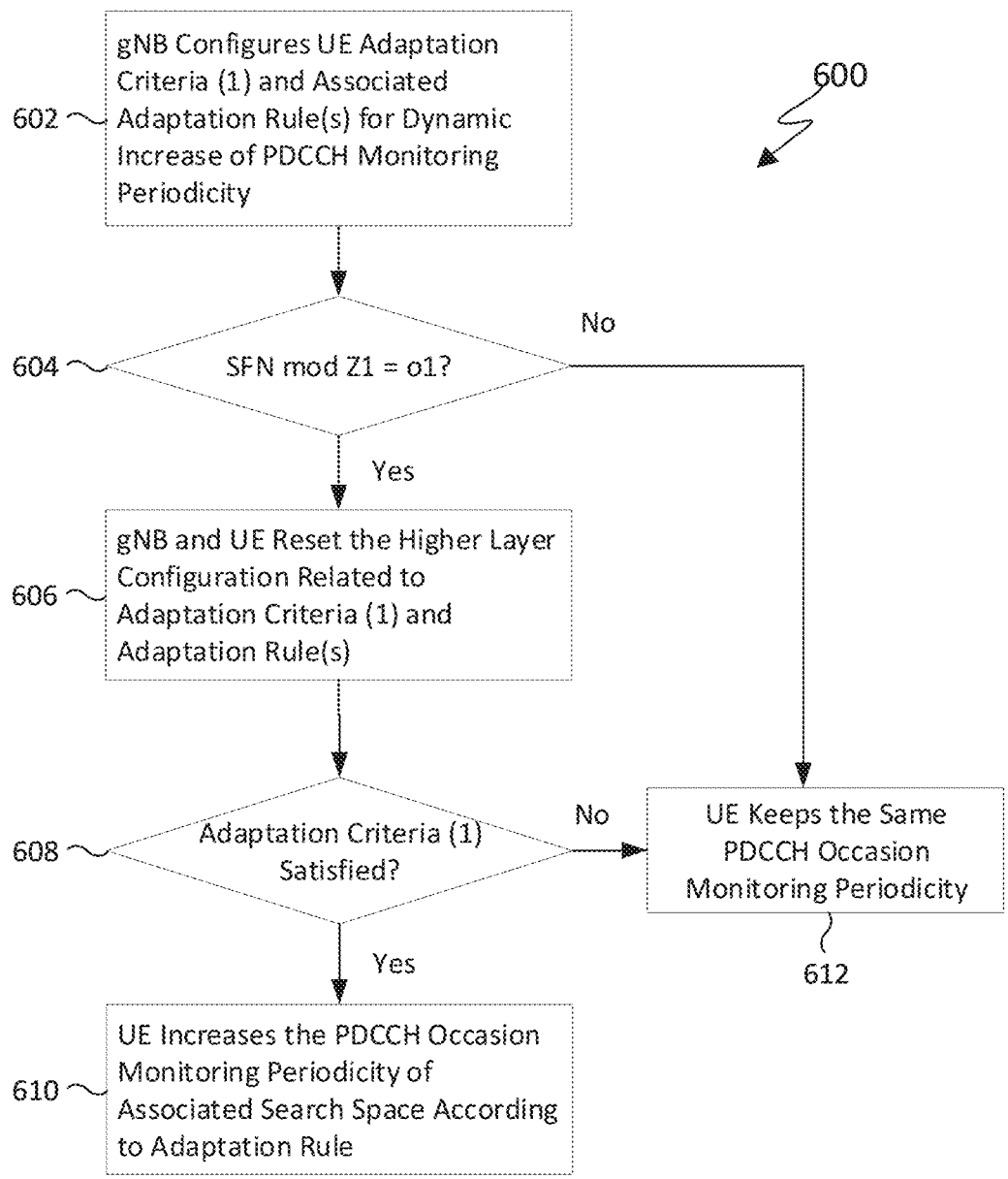
FIG. 6 illustrates a flowchart for managing PDCCH monitoring occasions by increasing search space periodicity in accordance with various embodiments of this disclosure.

FIG. 6 illustrates a flowchart for managing PDCCH monitoring occasions by increasing search space periodicity in accordance with various embodiments of this disclosure. Operations of flowchart 600 can be implemented in a UE, such as UE 116 in FIG. 2.

PDCCH monitoring periodicity associated with search space set s is denoted as $k\_\{s\}$ and is in the unit of one slot. In one embodiment, $k\_\{s\}$ can be adjusted to enable UE power savings according to adaptation criteria associated with real-time decoding results on PDCCH monitoring occasions for DCI formats scheduling PDSCH receptions or PUSCH transmission. The associated adaptation criteria for this embodiment described in FIG. 6 is referred to as Adaptation Criteria (1) to differentiate from the adaptation criteria for the other embodiments disclosed herein.

According to Adaptation Criteria (1), the UE does not detect any DCI format scheduling PDSCH/PUSCH in at least X1*100% of PDCCH monitoring occasion(s) over Y1>=1 consecutive PDCCH monitoring periods $k\_\{s\}$, where $0<=X1<=1$ and Y1 are either predetermined in the system operation or configured to the UE by higher layers. In a non-limiting example, X1=0.5 and Y1=2. In another non-limiting example, X1=1 and Y1=1.

When Adaptation Criteria (1) is satisfied, the UE can increase $k\_\{s\}$ according to one of the following adaptation rules:

Adaptation Rule 1.1: $k\_\{s\}=\min(c1*k\_\{s\}, k\hat{}max\_\{s\})$, where c1 is a positive integer, e.g. c1=2, and $k\hat{}max\_\{s\}$ is a maximum value of PDCCH monitoring periodicity;

Adaptation Rule 1.2: $k\_\{s\}=k\hat{}PS\_\{s\}$, where $k\hat{}PS\_\{s\}$ is a reference PDCCH monitoring periodicity configured to the UE by higher layers, for example as part of a configuration associated with UE operation in a power saving mode; or Adaptation Rule 1.3: $k\_\{s\}=\min(k\_\{s\}+k\hat{}delta\_\{s\}, k\hat{}max\_\{s\})$, where $k\hat{}delta\_\{s\}>=1$ is a positive constant, e.g. $k\hat{}delta\_\{s\}=1$, and $k\hat{}max\_\{s\}$ is a maximum value of the PDCCH monitoring periodicity $k\_\{s\}$.

The parameters X1, Y1, $k\hat{}max\_\{s\}$, c1, and $k\hat{}PS\_\{s\}$ can be determined by the UE in a number of different ways. In one non-limiting example, these parameters are fixed and defined in the specification of the system operation. In another non-limiting example, these parameters are provided to the UE through higher layer signaling. In yet another non-limiting example, these parameters are reported by the UE to a serving gNB and the gNB can provide respective values to the UE by physical layer signaling or by higher layer signaling.

In some embodiments, a reset scheme can be adopted to avoid error conditions involving $k\_\{s\}$, for example, a DCI format is transmitted, and the UE fails to detect it. In one example, the associated higher layer configuration are reset at a subframe, such that (SFN mod Z1)=o1, where o1 and Z1 are either predetermined in the system operation or configured to the UE by higher layers, e.g., o1=0 and Z1=10 or 20.

Flowchart 600 begins at operation 602 by configuring Adaptation Criteria (1) and one or more associated adaptation rules for dynamic increase of PDCCH monitoring periodicity.

In operation 604 a determination is made as to whether SFN mod Z1 equal o1. As previously mentioned, operation 604 is a reset scheme to help avoid certain error conditions involving $k\_\{s\}$. If SFN mod z1 equals o1, then in operation 606 the gNB and the UE reset the higher layer configuration related to the Adaptation Criteria (1) and the one or more adaptation rules. In operation 608 a determination is made as to whether Adaptation Criteria (1) is satisfied. If the Adaptation Criteria (1) is satisfied, then flowchart 600 proceeds to operation 610 where the UE increases the PDCCH occasion monitoring periodicity search space according to the one or more adaptation rules.

Returning to operation 604, if the determination is made that SFN mod Z1 is not equal to o1, then flowchart 600 proceeds to operation 612 where the UE keeps the same PDCCH occasion monitoring periodicity.

Returning to operation 608, if the determination is made that Adaptation Criteria (1) is not satisfied, then flowchart 600 proceeds to operation 612 where the UE keeps the same PDCCH occasion monitoring periodicity.

Figure 7:
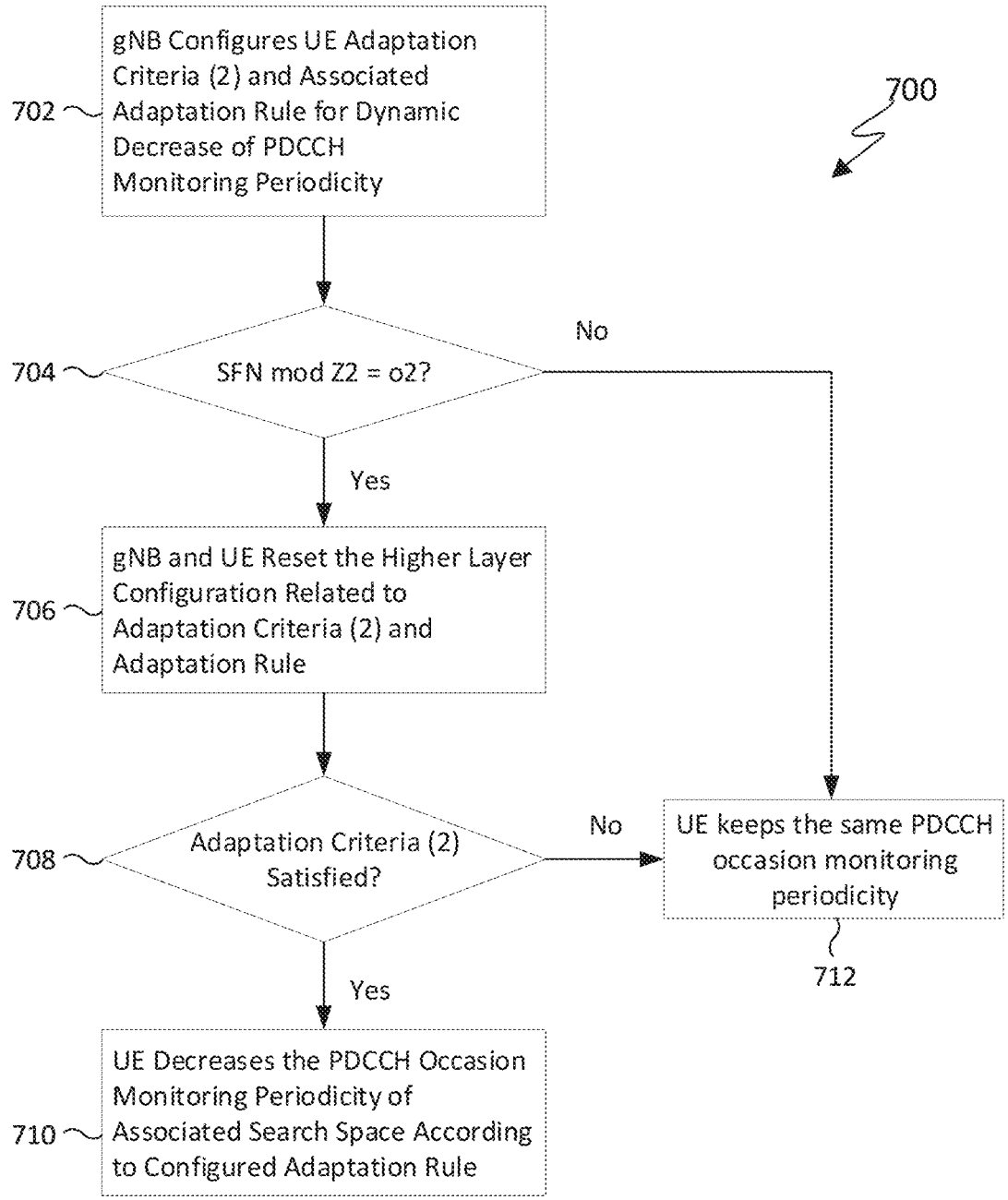
FIG. 7 illustrates a flowchart for managing PDCCH monitoring occasions by decreasing search space periodicity in accordance with various embodiments of this disclosure.

FIG. 7 illustrates a flowchart for managing PDCCH monitoring occasions by decreasing search space periodicity in accordance with various embodiments of this disclosure. Operations of flowchart 700 can be implemented in a UE, such as UE 116 in FIG. 2, to achieve lower latency.

In this illustrative embodiment, the PDCCH monitoring periodicity is decreased based on adaptation criteria associated with real-time decoding results on PDCCH monitoring occasions for DCI formats scheduling PDSCH receptions or PUSCH transmission. The associated adaptation criteria for this embodiment described in FIG. 7 is referred to as Adaptation Criteria (2) to differentiate from the adaptation criteria for the other embodiments disclosed herein.

According to Adaptation Criteria (2), in at least X2*100% of PDCCH monitoring occasion(s) and over Y2>=1 consecutive PDCCH monitoring periods, the UE detects a DCI format scheduling a PDSCH reception or a PUSCH transmission where $0<=X2<=1$ and Y2 are either predetermined in the system operation or configured to the UE by higher layers. In a non-limiting example, X2=0.5 and Y2=2. In another non-limiting example, X2=1 and Y2=1.

When Adaptation Criteria (2) is satisfied, the UE can reduce $k\_\{s\}$ according to one of the following adaptation rules:

Adaptation rule 2.1: $k\_\{s\}=\max(c2*k\_\{s\}, k\hat{}min\_\{s\})$, where $0<c2<1$ is a fractional number, e.g. c2=0.5, and $k\hat{}min\_\{s\}$ is a minimum value of PDCCH monitoring periodicity $k\_\{s\}$, e.g. $k\hat{}min\_\{p,s\}=1$;

Adaptation rule 2.2: $k\_\{s\}=k\hat{\ }0\_\{s\}$, where $k\hat{\ }0\_\{s\}$ is a configured PDCCH monitoring periodicity when the UE operates is configured to operate in a power saving mode, e.g. $k\hat{\ }0\_\{s\}=1$; or Adaptation rule 2.3: $k\_\{s\}=\max(k\_\{s\}-k\hat{\ }delta\_\{s\}, k\hat{\ }min\_\{s\})$, where $k\hat{\ }delta\_\{s\}>=1$ is a positive constant, e.g. $k\hat{\ }delta\_\{s\}=1$, and $k\hat{\ }min\_\{s\}$ is a minimum value of PDCCH monitoring periodicity. For example, $k\hat{\ }delta\_\{s\}$ can be provided to the UE by higher layers.

The parameters X2, Y2, $k\hat{\ }min\_\{s\}$, c2, and $k\hat{\ }0\_\{s\}$ can be determined by the UE in a number of different ways. In one non-limiting example, these parameters are fixed and defined in the specification of the system operation. In another non-limiting example, these parameters are provided to the UE by higher layers. In yet another non-limiting example, these parameters are reported by the UE to a serving gNB and the gNB can in response configure respective values to the UE by physical layer signaling or by higher layer signaling.

In some embodiments, a reset scheme can be adopted to avoid error conditions involving $k\_\{s\}$, for example, a DCI format is transmitted, and the UE fails to detect it. In one example, the associated higher layer configuration are reset at a subframe, such that (SFN mod Z2)=o2, where o2 and Z2 are either predetermined in the system operation or configured to the UE by higher layers, e.g. o2=0 and Z2=10, or 20.

Flowchart 700 begins at operation 702 by configuring Adaptation Criteria (2) and one or more associated adaptation rules for dynamic decrease of PDCCH monitoring periodicity.

In operation 704 a determination is made as to whether SFN mod Z2 equal o2. As previously mentioned, operation 704 is a reset scheme to help avoid certain error conditions involving $k\_\{s\}$. If SFN mod z2 equals o2, then in operation 706 the gNB and the UE reset the higher layer configuration related to the Adaptation Criteria (2) and the one or more adaptation rules. In operation 708 a determination is made as to whether Adaptation Criteria (2) is satisfied. If the Adaptation Criteria (2) is satisfied, then flowchart 700 proceeds to operation 710 where the UE decreases the PDCCH occasion monitoring periodicity search space according to the one or more adaptation rules.

Returning to operation 704, if the determination is made that SFN mod Z2 is not equal to o2, then flowchart 700 proceeds to operation 712 where the UE keeps the same PDCCH occasion monitoring periodicity.

Returning to operation 708, if the determination is made that Adaptation Criteria (2) is not satisfied, then flowchart 700 proceeds to operation 712 where the UE keeps the same PDCCH occasion monitoring periodicity.

Figure 8:
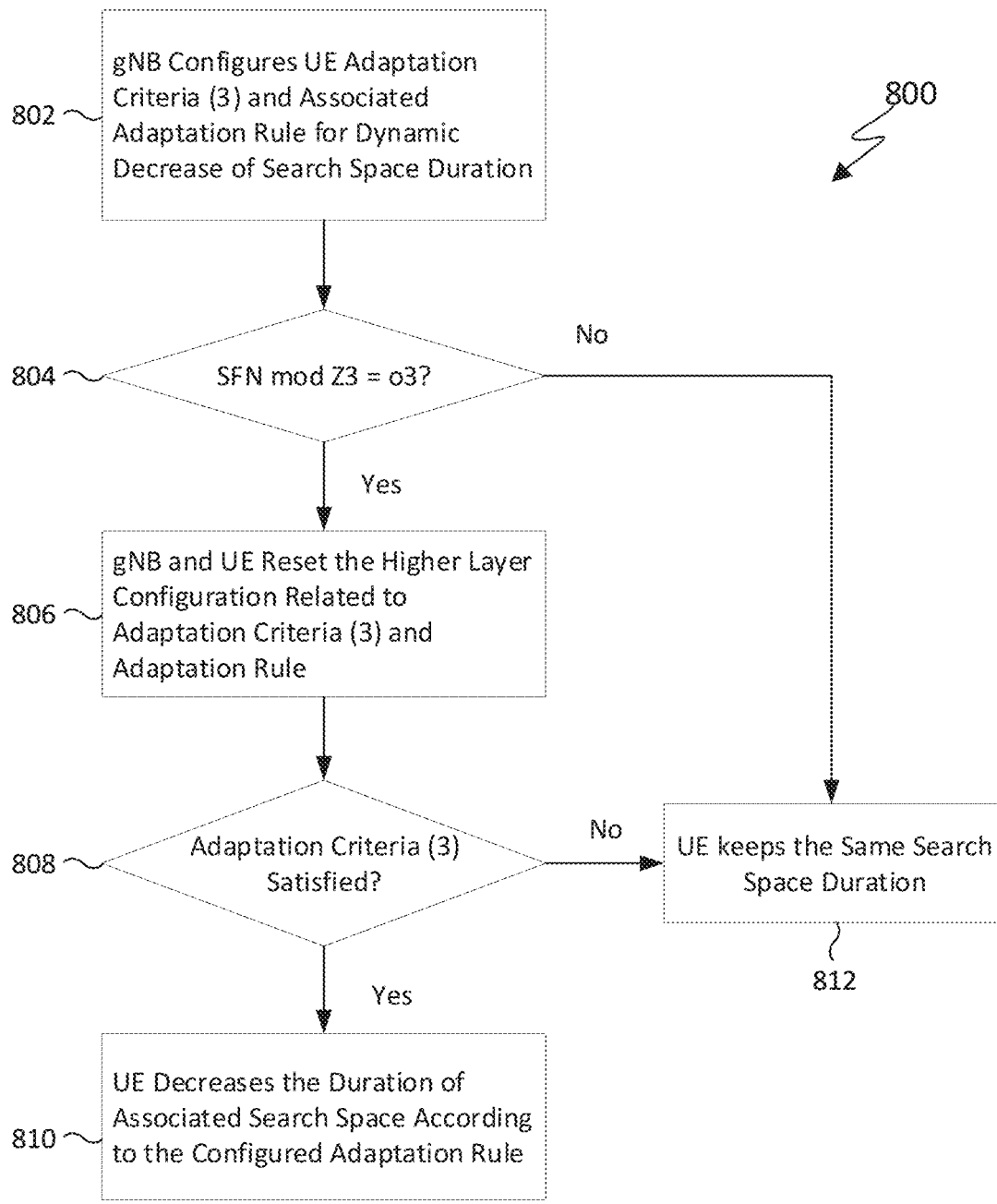
FIG. 8 illustrates a flowchart for managing PDCCH monitoring occasions by decreasing a duration of a search space set in accordance with various embodiments of this disclosure.

FIG. 8 illustrates a flowchart for managing PDCCH monitoring occasions by decreasing a duration of a search space set in accordance with various embodiments of this disclosure. Operations of flowchart 800 can be implemented in a UE, such as UE 116 in FIG. 2.

PDCCH monitoring duration for a PDCCH monitoring periodicity $k\_\{s\}$ associated with search space set s is denoted as $d\_\{s\}$, $1<=d\_\{s\}<k\_\{s\}$, and is in the unit of one slot. In one embodiment, the UE can decrease $d\_\{s\}$ according to adaptation criteria associated with real-time decoding results for DCI formats scheduling PDSCH receptions or PUSCH transmissions. The associated adaptation criteria for this embodiment described in FIG. 8 is referred to as Adaptation Criteria (3) to differentiate from the adaptation criteria for the other embodiments disclosed herein.

According to Adaptation criteria (3), the UE does not detect a DCI format scheduling a PDSCH reception or a PUSCH transmission in at least X3*100% of PDCCH monitoring occasion(s) or in Y3>=1 consecutive PDCCH monitoring periods, where 0<=X3<=1 and Y3 are constants. In a non-limiting example, X3=0.5 and Y3=2. In another non-limiting example, X3=1 and Y3=1.

When Adaptation Criteria (3) is satisfied the UE can increase $d\_\{s\}$ according to one of the following adaptation rules:

Adaptation rule 3.1: $d\_\{s\}=\max(c3*d\_\{s\}, d\hat{\ }min\_\{s\})$, where 0<c3<1 is a fractional number, e.g. c3=0.5, and $d\hat{\ }min\_\{s\}$ is a minimum value of the search space sets duration, e.g. $d\hat{\ }min\_\{s\}=1$;

Adaptation rule 3.2: $d\_\{s\}=d\hat{\ }PS\_\{s\}$, where $d\hat{\ }PS\_\{s\}$, is a search space set duration configured to the UE by higher layers for example, for UE operation in a power saving mode, e.g. $d\hat{\ }PS\_\{s\}=1$; or Adaptation rule 3.3: $d\_\{s\}=\max(d\_\{s\}-d\hat{\ }delta\_\{s\}, d\hat{\ }min\_\{s\})$, where $d\hat{\ }delta\_\{s\}$ controls a reduction of search spaces duration, e.g. $d\hat{\ }delta\_\{s\}=1$, and $d\hat{\ }min\_\{s\}$ is a minimum duration of search space set s.

The associated parameters X3, Y3, $d\hat{\ }min\_\{s\}$, c3, and $d\hat{\ }PS\_\{s\}$ can be determined by the UE in a number of different ways. In one non-limiting example, these parameters are fixed and defined in specification of the system operation. In another non-limiting example, these parameters are signaled to UE by higher layers. In yet another non-limiting example, these parameters are reported by the UE to a serving gNB and the gNB can in response configure respective values to the UE by physical layer signaling or by higher layer signaling.

In some embodiments, a reset scheme can be adopted to avoid error conditions involving $k\_\{s\}$, for example, a DCI format is transmitted, and the UE fails to detect it. In one example, the associated higher layer configuration are reset at a subframe, such that (SFN mod Z3)=o3, where o3 and Z3 are either predetermined in the system operation or configured to the UE by higher layers, e.g., o3=0 and Z3=10 or 20.

Flowchart 800 begins at operation 802 by configuring Adaptation Criteria (3) and one or more associated adaptation rules for dynamic decrease of search space duration.

In operation 804 a determination is made as to whether SFN mod Z3 equals o3. As previously mentioned, operation 804 is a reset scheme to help avoid certain error conditions involving $k\_\{s\}$. If SFN mod z3 equals o3, then in operation 806 the gNB and the UE reset the higher layer configuration related to the Adaptation Criteria (3) and the one or more adaptation rules. In operation 808 a determination is made as to whether Adaptation Criteria (3) is satisfied. If the Adaptation Criteria (3) is satisfied, then flowchart 800 proceeds to operation 810 where the UE decreases the duration of associated search space according to the one or more configured adaptation rules.

Returning to operation 804, if the determination is made that SFN mod Z3 is not equal to o3, then flowchart 800 proceeds to operation 812 where the UE keeps the same search space duration.

Returning to operation 808, if the determination is made that Adaptation Criteria (3) is not satisfied, then flowchart 800 proceeds to operation 812 where the UE keeps the same search space duration.

Figure 9:
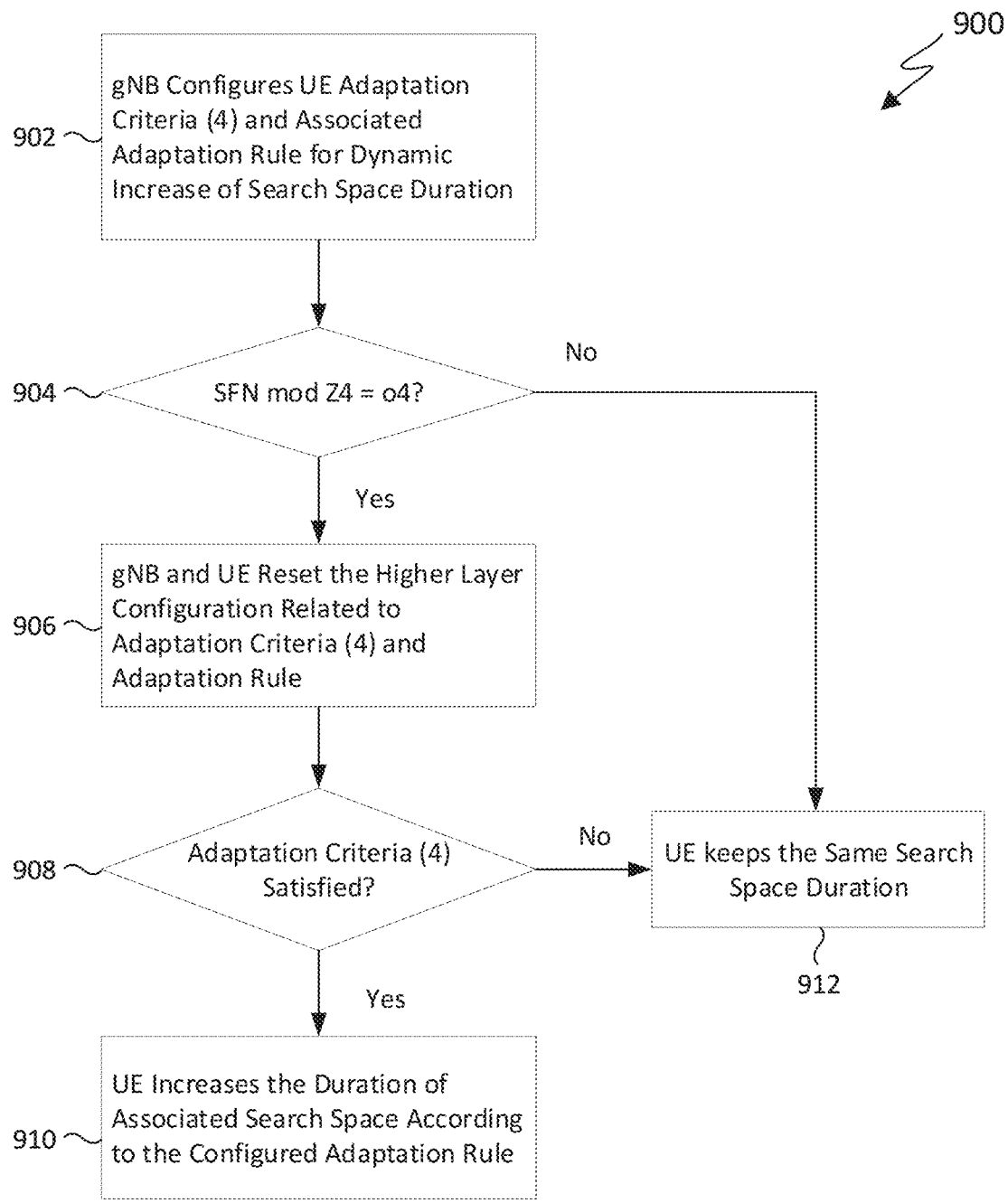
FIG. 9 illustrates a flowchart for managing PDCCH monitoring occasions by increasing a duration of a search space set in accordance with various embodiments of this disclosure.

FIG. 9 illustrates a flowchart for managing PDCCH monitoring occasions by increasing a duration of a search space set in accordance with various embodiments of this disclosure. Operations of flowchart 900 can be implemented in a UE, such as UE 116 in FIG. 2, to achieve lower latency.

In one embodiment, the UE can increase $d\_\{s\}$ according to adaptation criteria associated with real-time decoding results for DCI formats scheduling PDSCH receptions or PUSCH transmissions. The associated adaptation criteria for this embodiment described in FIG. 9 is referred to as Adaptation Criteria (4) to differentiate from the adaptation criteria for the other embodiments disclosed herein.

According to Adaptation criteria (4), the UE detects DCI formats scheduling PDSCH receptions or PUSCH transmissions in at least X4*100% of PDCCH monitoring occasion(s) within a PDCCH monitoring period or over Y4>=1 consecutive PDCCH monitoring periods, where 0<=X4<=1 and Y4 are either defined in the specification of the system operation or are provided to the UE by higher layers. In a non-limiting example, X4=0.5 and Y4=2. In another non-limiting example, X4=1 and Y4=1.

When Adaptation Criteria (4) is satisfied, the UE can increase d_{s} according to one of the following adaptation rules:

Adaptation rule 4.1: d_{s}=min(c4*d_{s}, d^max_{s}), where c3 is a constant, c4>1, e.g. c4=2, and d^max_{s}, is a maximum PDCCH monitoring duration for search space set s, e.g. d^max_{s}=k_{s};

Adaptation rule 4.2: d_{s}=d^0_{s}, where d^0_{s} is a PDCCH monitoring duration for search space sets provided to the UE by higher layers, e.g. d^PS_{s}=1; or Adaptation rule 4.3: d_{s}=min(d_{s}+d^delta_{s}, d^max_{s}), where d^delta_{s}>0 is provided to the UE by higher layers, e.g. d^delta_{s}=1, and d^ax_{s} is a maximum PDCCH monitoring duration for search space set s.

The associated parameters X4, Y4, d^max_{s}, c4, and d^0_{s} can be provided to a UE in a number of different ways. In one non-limiting example, these parameters are fixed and defined in the specification of the system operation. In another non-limiting embodiment, these parameters are signaled to the UE by higher layers. In yet another non-limiting embodiment, these parameters are reported by the UE to a serving gNB and the gNB can in response configure respective values to the UE by physical layer signaling or by higher layer signaling.

In some embodiments, a reset scheme can be adopted to avoid error conditions involving k_{s}, for example, a DCI format is transmitted, and the UE fails to detect it. In one example, the associated higher layer configuration are reset at a subframe, such that (SFN mod Z4)=o4, where o4 and Z4 are either predetermined in the system operation or configured to the UE by higher layers, e.g., o4=0 and Z4=10 or 20.

Flowchart 900 begins at operation 902 by configuring Adaptation Criteria (4) and one or more associated adaptation rules for dynamic increase of search space duration.

In operation 904 a determination is made as to whether SFN mod z4 equals o4. As previously mentioned, operation 904 is a reset scheme to help avoid certain error conditions involving k_{s}. If SFN mod z4 equals o4, then in operation 906 the gNB and the UE reset the higher layer configuration related to the Adaptation Criteria (4) and the one or more adaptation rules. In operation 908 a determination is made as to whether Adaptation Criteria (4) is satisfied. If the Adaptation Criteria (4) is satisfied, then flowchart 900 proceeds to operation 910 where the UE increases the duration of associated search space according to the one or more configured adaptation rules.

Returning to operation 904, if the determination is made that SFN mod z4 is not equal to o4, then flowchart 900 proceeds to operation 912 where the UE keeps the same search space duration.

Returning to operation 908, if the determination is made that Adaptation Criteria (4) is not satisfied, then flowchart 900 proceeds to operation 912 where the UE keeps the same search space duration.

Figure 10:
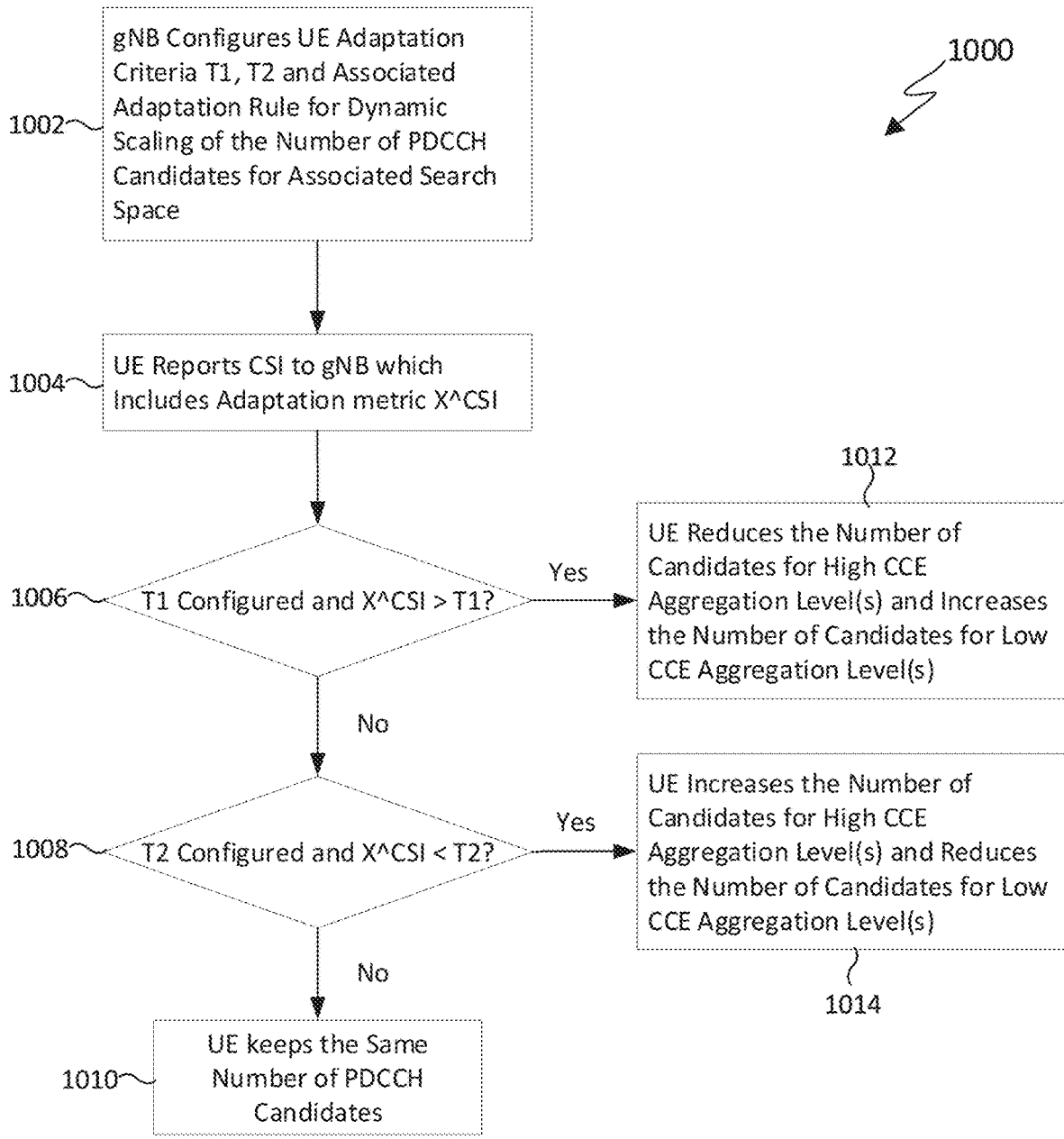
FIG. 10 illustrates a flowchart for managing PDCCH monitoring occasions by scaling a number of PDCCH candidates in accordance with various embodiments of this disclosure.

FIG. 10 illustrates a flowchart for managing PDCCH monitoring occasions by scaling a number of PDCCH candidates in accordance with various embodiments of this disclosure. Operations of flowchart 1000 can be implemented in a UE, such as UE 116 in FIG. 2.

This embodiment is directed to dynamic adaptation of a number of PDCCH candidates for search space set s, denoted as M^L_{s}, per CCE aggregation level (AL), L. A UE can adapt M^L_{s} according to a latest reported channel state information (CSI). Let X^CSI denote a selected CSI metric for triggering an adaptation of a number of PDCCH candidates. X^CSI can be a L1-RSRP or a CQI.

Except for the CSI reporting scheme supported in NR REL-15, CORSET-based CSI reporting can be supported, and can be beneficial for supporting adaptation on search space configuration, such as PDCCH candidates per AL In one example of this embodiment, the CORSET-RSRP can be defined as the linear average over the power contributions (in [W]) of the resource elements that carry PDCCH DMRS in associated CORSET.

In another example of this embodiment, the CORSET-RSRQ can be defined as the ratio of N×SS-RSRP/NR carrier RSSI, where N is the number of resource blocks in the NR carrier RSSI measurement bandwidth. The measurements in the numerator and denominator shall be made over the same set of resource blocks. NR carrier Received Signal Strength Indicator (NR carrier RSSI), is the linear average of the total received power (in [W]) observed only in certain OFDM symbols of measurement time resource(s), in the measurement bandwidth, over N number of resource blocks from all sources, including co-channel serving and non-serving cells, adjacent channel interference, thermal noise etc. The measurement time resource(s) for NR Carrier RSSI are confined within the configured OFDM symbols of search space related to the associated CORSET.

In yet another example of this embodiment, the CORSET-SINR can be defined as the linear average over the power contribution (in [W]) of the resource elements carrying DMRS for PDCCH divided by the linear average of the noise and interference power contribution (in [W]) over the resource elements carrying DMRS for PDCCH within the same frequency bandwidth. The measurement time resource(s) for CORSET-SINR are confined within the configured OFDM symbols of search space related to the associated CORSET.

The CORSET-based CSI can report the latest measurement result either periodically through pre-configured PUCCH resources or in PUSCH triggered by scheduling DCI.

In another example of this embodiment, a UE can adapt M^L_{s} according to Adaptation Criteria 5a, i.e., when the UE reports to a serving gNB that X^CSI>T1, where T1 is a threshold provided to the UE by higher layers. For example, T1=-90 dBm when X^CSI is L1-RSRP, or T1=15 when X^CSI is CQI. When the report from the UE indicates a good channel/link quality, and UE receives the HARQ-ACK feedback from gNB in response to its CSI report if configured, the UE can reduce a number of PDCCH candidates for the larger CCE aggregation level(s) and increase a number of PDCCH candidates for the smaller CCE aggregation level(s). The associated adaptation rules can be defined as follows:

Adaptation Rule 5.1: $M\hat{}L\_\{s\}=floor(max(M\hat{}L\_\{s\}*s1, M\_min))$, for the $N1>=1$ highest AL(s), . . . ; and Adaptation Rule 5.2: $M\hat{}L\_\{s\}=floor(min(M\hat{}L\_\{s\}*s2, M\_max))$, for the $N2>=1$ lowest AL(s), . . . .

where s1 and s2 are scalars, such that $0<s1<1$, $s2>1$ e.g. s1=0.5, s2=2, and M_max and M_min are maximum and minimum numbers of PDCCH candidates per CCE aggregation level, respectively, e.g. M_max=8 and M_min=0.

In another example of this embodiment, a UE can adapt $M\hat{}L\_\{s\}$ according to Adaptation Criteria 5b, i.e., when the UE reports to a serving gNB that $X\hat{}CSI<T2$ where T2 is a threshold provided to the UE by higher layers. For example, T2=−100 dBm when $X\hat{}CSI$ is L1-RSRP, or T2=10 when $X\hat{}CSI$ is CQI. When the report from the UE indicates a bad channel/link quality, and UE receives the HARQ-ACK feedback from gNB in response to its CSI report if configured, the UE can increase a number of candidates for the larger CCE aggregation level(s) and decrease a number of candidates for the smaller CCE aggregation level(s). The associated adaptation rules can be defined as follows:

Adaptation Rule 5.3: $M\hat{}L\_\{s\}=floor(min(M\hat{}L\_\{s\}*s3, M\_max))$, for the $N3>=1$ highest AL(s), . . . ; and Adaptation Rule 5.4: $M\hat{}L\{s\}=floor(max(M\hat{}L\{s\}*s4, M\_min))$, for the $N4>=1$ lowest AL(s), . . . .

where s3 and s4 are scalars, such that $s3>1$, $0<s4<1$ e.g. s3=2, s4=0.5, and M_max and M_min are the maximum and minimum numbers of PDCCH candidates per CCE aggregation level, respectively, e.g. M_max=8 and M_min=1.

Flowchart 1000 of FIG. 10 beings at operation 1002 with a gNB configuring UE Adaptation Criteria 5a and 5b and the associated adaptation rules for dynamic scaling of the number PDCCH candidates for an associated search space. Non-limiting examples of these adaptation rules can include Adaptation Rules 5.1, 5.2, 5.3, and 5.4.

Thereafter, in operation 1004, a UE reports CSI to the gNB. The CSI includes the adaptation metric $X\hat{}CSI$. In operation 1006, a determination is made as to whether T1 is configured and $X\hat{}CSI$ is greater than T1. In other words, a determination is made as to whether Adaptation Criteria (5a) is satisfied. If Adaptation Criteria (5a) is not satisfied, then flowchart 1000 proceeds to operation 1008 to make another determination as to whether T2 is configured and $X\hat{}CSI$ is less than T2. In other words, a determination is made as to whether Adaptation Criteria (5b) is satisfied. If Adaptation Criteria (5b) is not satisfied, then flowchart 1000 proceeds to operation 1010 and the UE keeps the same number of PDCCH candidates.

Returning to operation 1006, if the determination is made that Adaptation Criteria (5a) is satisfied, then flowchart 1000 proceeds to operation 1012 where the UE reduces the number of candidates for high-CCE aggregation levels according to Adaptation Rule 5.1 and increases the number of candidates for low-CCE aggregation levels according to Adaptation Rule 5.2.

Returning to operation 1008, if the determination is made that Adaptation Criteria (5b) is satisfied, then flowchart 1000 proceeds to operation 1014 where the UE increases the number of candidates for high-CCE aggregation levels according to Adaptation Rule 5.3 and decreases the number of candidates for low-CCE aggregation levels according to Adaptation Rule 5.4.

According to another embodiment, UE power management can be achieved by UE adaptation of a minimum scheduling offset, Kmin, which can be received in the unit of slot through a physical layer signal/channel. Kmin is used to determine the applicable values of scheduling offset for data reception or transmission scheduled by PDCCH. For any associated scheduling offset parameter, X, the UE expects that $X>=Kmin+C\_X$, where $C\_X>=0$ and is an integer, e.g. C_X=0. The associated scheduling offset parameter, X, can be any of the following:

a timing offset between a last symbol for a reception of a DCI format scheduling a PDSCH reception, denoted as K0;

a timing offset between a last symbol for a reception of a DCI format scheduling a PUSCH reception, denoted as K2;

an aperiodic CSI-RS triggering offset; or an SRS triggering offset.

When the applicable value of minimum scheduling offset is configured or indicated separately for associated scheduling offset parameters, X, Kmin in this disclosure is equivalent to the minimum value among all the applicable values of minimum scheduling offsets for associated scheduling offset parameters. For example, when a UE is indicated or configured with $K\hat{}DL\_min$ as minimum applicable value for K0 for active DL BWP, and $L\hat{}UL\_min$ as minimum applicable value for K2 for active UL BWP, the UE assumes $Kmin=min(K\hat{}DL\_min, K\hat{}UL\_min)$ for the active BWP for the carrier where UE monitors PDCCH.

To avoid the negative impact to URLLC service, a UE can assume the indicated Kmin does not apply to the PDCCH monitoring associated with URLLC service. For example, a UE assumes that the indicated Kmin does not apply to the search space set that is configured with mini-slot scheduling or more than one first symbols of CORESET within a slot for PDCCH monitoring by monitoringSymbolsWithinSlot as defined in REF 3. The UE assumes no restriction on any scheduling offset parameter for PDCCH reception in the search space set that Kmin does not apply.

C_X can be determined per associated scheduling offset parameter, X. For example, C_X=0 for X=K0 or X=aperiodic CSI-RS triggering offset. In another example, C_X=1 for X=K2 or X=SRS triggering offset. In this case, an applicable value of Kmin indicated by a physical layer signal/channel can be shared by multiple associated scheduling offset parameters, while the actual minimum applicable value can be different for the associated scheduling offset parameters due to the different value of C_X. The adaptation on the minimum applicable value for multiple scheduling offset parameters can be jointly indicated through the indication of a unified value for Kmin.

A UE can determine the value of C_X through any of the following methods. In one example, one C_X can be configured through RRC signaling per cell or per BWP or per UE.

In another example, one or two candidate values for C_X can be configured through RRC signaling per BWP. When only one candidate value of C_X is configured, the value should be larger than zero. For joint indication based on 1-bit indication in DCI format 0_1/1_1, the 1-bit indication indicates the value for Kmin and C_X. When only one candidate value is provided for associated scheduling offset X, for example, K2, the 1-bit indication in DCI format 0_1/1_1 indicate zero or the non-zero candidate value for C_X. When two candidate values are provided for associated scheduling offset X, for example, K2, the 1-bit indication in DCI format 0_1/1_1 indicate the first or the second candidate value for C_X.

In yet another example, C_X can be reported to gNB from UE as UE capability information. If the UE reports the values for C_X in the unit of ms, denoted as C'_X. In this case, the UE needs to convert it into C_X in the unit of slot, such that $C\_X=\lfloor C'\_X*2^u \rfloor$ or $C\_X=\lceil C\_X*2^u \rceil$, where u is the subcarrier spacing configuration of the active BWP where the UE monitors the physical layer signal/channel for an indication of Kmin. For example, UE can report two values, denoted as C_UL and C_DL, where C_UL and C_DL are applicable for UL related scheduling offsets, such as K2 or SRS triggering offset while C_DL is applicable for DL related scheduling offsets, such as K0 or aperiodic CSI-RS trigger offset, respectively.

When a UE is configured with candidate minimum applicable value(s) for K0 in DL BWP and candidate minimum applicable value(s) K2 in UL BWP, respectively, the UE does not expect to be indicated with minimum applicable value of K0 that is larger than minimum applicable value of K2.

In one example for configuration of candidate values for Kmin, N>=1 candidate values for Kmin can be configured per BWP through RRC signaling. For frequency division duplex (FDD) with paired spectrum, the same set of candidate values of Kmin is shared between the paired DL BWP and UL BWP, and the candidate values of Kmin can be configured either in the DL BWP or the UL BWP. For time division duplex (TDD), the same set of candidate values of Kmin can be shared between a DL BWP and UL BWP with same center frequency, and the candidate values of Kmin can be configured either in the DL BWP or in the UL BWP.

A list of candidate values for Kmin can be predetermined or preconfigured per Cell or per configured BWP.

In one example for determination of the list of candidate values of Kmin, the list of candidate values for Kmin can be determined based on UE assistance information on its preferred values. For example, to reduce signaling overhead without sacrificing power saving gain, two candidates, i.e. a default candidate and a non-zero candidate, can be considered. A UE can report at least its preferred value for the non-zero candidate based on the UE capability or its needs for power saving. In this case, a binary bit transmitted through physical layer signal/channel from gNB is enough to deliver the new Kmin to UE. For another example, UE can report more than one preferred candidate values for Kmin, the indicated Kmin from gNB is selected from one of the preferred candidate values. When UE is configured with more than one serving cell in CA mode, the UE can report one or more preferred applicable value(s) of Kmin either for all serving cells or the UE can report one or more preferred applicable value(s) of Kmin per serving cell.

In another example, the UE is provided with a default value for Kmin, denoted as Kmin_0. In one sub-example, the default value can be zero. In another sub-example, the default value can be the minimum applicable value in configured time domain resource allocation (TDRA) tables for PDSCH or PUSCH. In yet another sub-example, the default value can be the minimum value among the list of configured candidate values for Kmin. In yet another sub-example, the default value can be the maximum candidate value for Kmin.

In one embodiment, Kmin_0 can be applied before receiving any dynamic indication of Kmin through physical layer signal/channel. In another embodiment, Kmin_0 is applied when a UE receives any invalid configuration parameter, X, such that X<Kmin. In yet another embodiment, Kmin_0 is applied when the UE is switched to another BWP. In another embodiment, Kmin_0 is applied when the UE receives any invalid configuration parameter, X, such that X is smaller than the current valid Kmin through a physical layer signal/channel, for example, a fallback DCI or DCI format 0_0 or DCI format 1_0, and there is no indication of applicable value for Kmin in the physical layer signal/channel.

In yet another example, UE can report its capability on the applicable value for Kmin based on its implementation on PDCCH processing relaxation. The applicable value for Kmin can be reported per serving cell.

For the indication method of Kmin, an additional field with size of N_bits can be included in existing DCI format in the active BWP of the scheduling cell where UE monitors PDCCH, for example DCI format 0_1 or DCI format 0_1. The size of the DCI field in the DCI format to indicate Kmin can be determined such as, N_bits=ceil(log 2(N_Kmin)) bits, where N_Kmin is the number of the candidate applicable values for Kmin to select. When N_Kmin is less than 1, the DCI field for indicating Kmin can be absent. When the field is present, it indicates the index of the predetermined/preconfigured candidate values of Kmin. The indicated Kmin is applied to the active BWP of the carrier where the scheduled PDSCH/PUSCH is transmitted.

A UE can be provided with an application delay for applying a new indicated applicable value for Kmin, i.e. T1 in the unit of one slot.

When a UE receives an applicable value of Kmin in slot n in the scheduling cell through a scheduling DCI format to schedule a PDSCH/PUSCH in a target BWP for a scheduled cell, if the indicated Kmin is different than the default Kmin or currently applied value of Kmin in the target BWP of scheduled cell, the UE is not expected to apply the newly indicated Kmin before slot n' in the target BWP of the scheduled cell, where $n'=\lfloor (n+T1)\cdot 2^{u^{data}-u^{PDCCH}} \rfloor$ or $\lceil (n+T1)\cdot 2^{u^{data}-u^{PDCCH}} \rceil$, $u^{data}$ and $u^{PDCCH}$ are the subcarrier spacing configurations for PDSCH/PUSCH and PDCCH, respectively.

When the UE operates in CA mode and is configured with cross-carrier scheduling, the application delay T1 can be determined in a number of different ways.

In one embodiment, T1 is associated with min(Y0,Ymin), where Y0 is the current Kmin for the active BWP of the scheduling cell that UE receives the scheduling DCI, $Ymin=min\{\lfloor Yi*2^{u^{PDCCH}-u^{data}} \rfloor\}$ or $min\{\lceil Yi*2^{u^{PDCCH}-u^{data}} \rceil\}$, and Yi is the current valid Kmin or default Kmin of the active BWP in any associated scheduled cell with carrier indicator of i. For example, Y=max(min(Y0, Ymin), Z), where Z is a predefined constant per SCS, e.g. Z=(1, 1, 2, 2) for SCS of (15,30,60,120)KHz, respectively. When a UE detects an invalid indication for any associated parameter, X, such that X<Kmin+C_X in a physical layer signal/channel, and the physical layer signal/channel also indicate an applicable value for Kmin, the UE can apply the indicated Kmin immediately after decoding the physical layer signal/channel.

In another embodiment, T1 is associated with $Ymin=min\{\lceil Yi*2^{u^{PDCCH}-u^{data}} \rceil\}$, and Yi is the current valid Kmin or default Kmin of the active BWP in any associated scheduled cell with carrier indicator of i. For example, T1=max(Ymin, Z), where Z is a predefined constant per SCS, e.g. Z=(1, 1, 2, 2) for SCS of (15,30,60,120)KHz, respectively. When a UE detects an invalid indication for any associated parameter, X, such that X<Kmin+C_X in a physical layer signal/channel, and the physical layer signal/channel also indicate an applicable value for Kmin, the UE can apply the indicated Kmin immediately after decoding the physical layer signal/channel.

In yet another embodiment, T1=(Y0, Z), where Z is a predefined constant per SCS, e.g. Z=(1, 1, 2, 2) for SCS of (15,30,60,120)KHz, and Y0 is Kmin for the active BWP of the scheduling cell, respectively. In this case, UE assumes $\lceil Yi*2^{u^{PDCCH}-u^{data}} \rceil > Y0$, where Yi is the current valid Kmin or default Kmin of the active BWP in any associated scheduled cell with carrier indicator of i.

In yet another embodiment, when the UE operates in CA mode and is configured with both same carrier scheduling and cross-carrier scheduling with a same scheduling cell, T1 can be associated with the current valid Kmin or default Kmin of the active BWP in any associated scheduled cell with carrier indicator of i, denoted as Yi, and the current Kmin for the active BWP of the scheduling cell that UE receives the scheduling DCI, denoted as Y0. For example, T1=max(min(Ymin, Y0), Z), where Ymin=min$\{\lceil Yi*2^{u^{PDCCH}-u^{data}}\rceil\}$, and Z is a predefined constant per SCS, e.g. Z=(1, 1, 2, 2) for SCS of (15,30,60,120) KHz, respectively.

For a UE configured with both same-carrier scheduling and cross-carrier scheduling in CA mode, the application delay for a new Kmin received on a scheduling cell is associated with the applicable value of Kmin among all scheduled Cells with SCS normalization, such that Tmin=min$\{\lfloor Kmin, i*2^{u^{PDCCH}-u^{i}}\rfloor\}$ or Tmin=min$\{\lceil Kmin, i*2^{u^{PDCCH}-u^{i}}\rceil\}$, where Kmin, i is the current applicable value of Kmin for the active BWP on a scheduled cell with carrier indicator of i; $u^i$ and $u^{PDCCH}$ are the subcarrier spacing configurations for the active BWP on scheduled cell i and scheduling cell, respectively. T1 should be no smaller than Tmin.

As there is no HARQ-ACK feedback with respect to PDCCH reception, gNB and UE may apply different applicable value for Kmin if UE fails on receiving a DCI indicating a new Kmin. In this case, UE may miss buffering PDSCH/PUSCH/aperiodic CSI-RS when Kmin assumed by UE is larger than the Kmin assumed by gNB. Therefore, the UE ends up wasting unnecessary energy on retransmission PDSCH/PUSCH/aperiodic CSI-RS, and the gNB may trigger unnecessary link adaptation to improve PDSCH reception while the channel condition is still good. To avoid this issue, a gNB can have an applicable delay for applying a new Kmin that is relatively larger than the one used by UE, such that T2=N*T1, where T2 is the applicable delay used by gNB, and N is a positive integer, e.g. N=2. The longer applicable delay for a new Kmin at gNB makes UE robust against miss detecting of DCI. When a gNB transmits a new Kmin in slot n through a physical layer signal/channel, the gNB is not expected to apply the new indicated minimum applicable value(s) before slot n' in the target BWP of the scheduled cell, where n'=$\lceil (n+T2)\cdot 2^{u^{data}-u^{PDCCH}}\rceil$. For flexible configuration and efficient adaptation, N>=1 can be determined based on assistance information transmitted from UE. A UE can transmit assistance information through a higher layer, for example a MAC CE via a PUSCH, to gNB indicating its preferred value for N, such as N=2. A gNB can configure the value for T2 up to its implementation. In one example, after receiving the feedback of N from the UE, a gNB can determine the value for T2, such as T2=N*T1.

Figure 11:
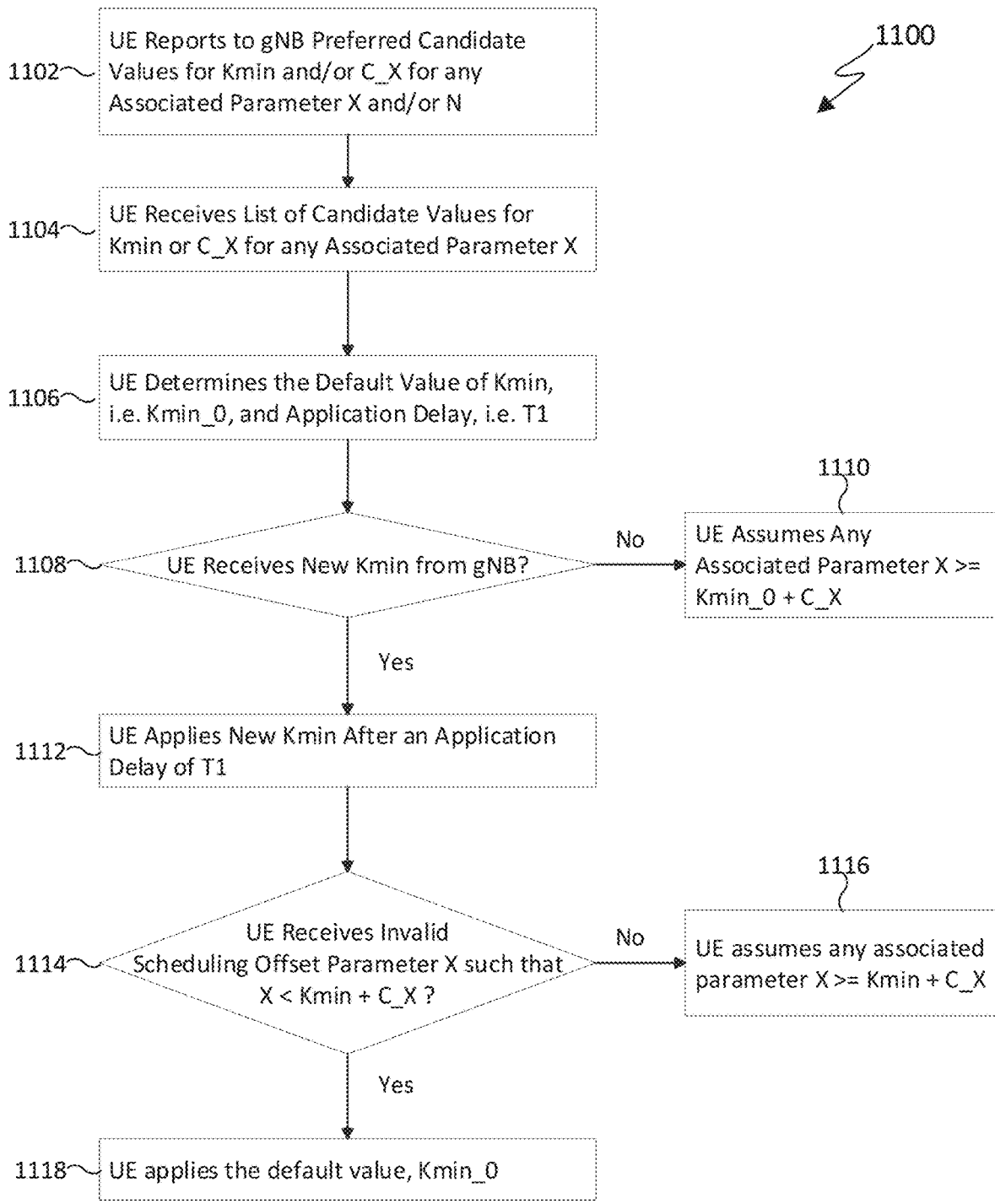
FIG. 11 illustrates a flowchart for managing PDCCH monitoring occasions by adapting a minimum scheduling offset in accordance with various embodiments of this disclosure.

FIG. 11 illustrates a flowchart for managing PDCCH monitoring occasions by adapting a minimum scheduling offset in accordance with various embodiments of this disclosure. Operations of flowchart 1100 can be implemented in a UE, such as UE 116 in FIG. 2.

Flowchart 1100 begins at operation 1102 by reporting to a gNB its preferred candidate value(s) for Kmin and/or C_X for any associated parameter As illustrated in FIG. 11, a UE can report to gNB its preferred candidate value(s) for Kmin, or C_X for any associated scheduling offset parameter X, or an application delay extension factor, N, used at gNB.

In operation 1104, a list of candidate values for Kmin or C_X are received for any associated scheduling offset parameter X.

In operation 1106, a default value of Kmin, Kmin_0, and an application delay, T1, are determined. The default value of Kmin_0 is determined before receiving any indicated value of Kmin through physical layer signal/channel.

In operation 1108, a determination is made as to whether a new Kmin is received through a physical layer signal/channel from gNB. If a new Kmin is not received through a physical layer signal/channel from the gNB, then flowchart 1100 proceeds to operation 1110 and the UE determines the minimum applicable value for any associated scheduling offset parameter X based on the default value Kmin_0 which satisfies the relationship X>=Kmin_0+C_X. However, if a new Kmin is received through a physical layer signal/channel from the gNB at operation 1108, then flowchart 1100 proceeds to operation 1112, and the UE applies the newly received Kmin after the application delay T1.

In operation 1104, a determination is made as to whether the UE receives an invalid scheduling offset parameter X that satisfies the relationship X<Kmin+C_X. If the UE does not receive an invalid scheduling offset parameter X, then then flowchart 1100 proceeds to operation 1116 and the UE assumes that any associated scheduling offset parameter X satisfies the relationship X>=Kmin+C_X, i.e, the UE assumes any associated scheduling offset parameter X is no smaller than the latest indicated Kmin, such that X>=Kmin+C_X. However, if the UE receives an invalid scheduling offset parameter X in operation 1114, then flowchart 1100 proceeds to operation 1118 where the UE falls back to the default value Kmin_0.

Another embodiment is directed to UE adaptation for PDCCH monitoring on SCells. A UE can be configured for 'dormancy' and 'non-dormancy' behaviors on an active SCell regarding different PDCCH monitoring configuration for the active SCell where, for example when the SCell is 'dormant' the UE does not monitor PDCCH at least for DCI formats scheduling PDSCH reception to or PUSCH transmissions from the UE (the reverse applies when the cell is 'non-dormant'). A UE can be triggered to switch between a 'dormancy' and a 'non-dormancy' behavior for active SCells by a physical layer signal/channel on the PCell/PSCell.

For a UE in RRC CONNECTED state configured with discontinuous reception (C-DRX), a PDCCH can provide a DCI format that includes a field indicating to the UE whether or not to "wake up" for PDCCH monitoring in next one or more DRX ON duration(s). For example, a UE can be configured by a gNB to receive, outside of the DRX Active Time for the UE, a PDCCH that provides a DCI format with 1 bit indication per UE to indicate to the UE whether or not to monitor PDCCH candidates in associated search space sets in one or more of the subsequent DRX ON duration(s) for the PCell or PSCell. The indication can be extended to also apply for transition between 'dormancy' and 'non-dormancy' behaviors for active SCells. When the UE is indicated by a field in a DCI format to monitor PDCCH in next DRX ON duration(s) for the PCell or PSCell, the UE is also indicated by the same field to switch to 'non-dormancy' behavior for active SCells; otherwise, when the UE is indicated to skip PDCCH monitoring for next DRX ON duration(s) for the PCell or PSCell, the UE is also indicated to switch to 'dormancy' behavior for the active SCells.

When the UE is indicated to skip PDCCH monitoring, the UE can still perform certain functionalities on the PCell that the UE does not perform on SCells. For example, the UE can still transmit PRACH or a PUCCH with positive SR or even monitor PDCCH in a common search space on the PCell while the UE does not perform any of these functionalities on the SCells. When the UE begins to monitor PDCCH in response to a PRACH transmission or a PUCCH transmission with positive SR, the UE can activate PDCCH monitoring only on the PCell while the SCells can be kept 'dormant' without PDCCH monitoring. Also, the UE can perform measurements of a CSI-RS to obtain a CSI report for any of the cells.

Figure 12:
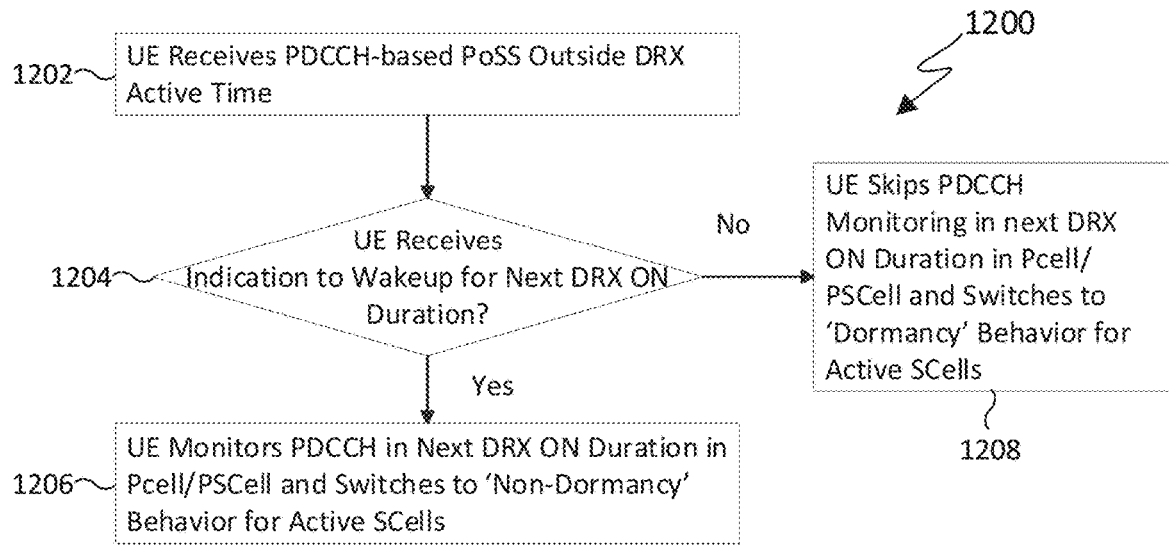
FIG. 12 illustrates a flowchart for transitioning between dormancy and non-dormancy behavior in accordance with various embodiments of this disclosure.

FIG. 12 illustrates a flowchart for transitioning between dormancy and non-dormancy behavior in accordance with various embodiments of this disclosure. Operations of flowchart 1200 can be implemented in a UE, such as UE 116 in FIG. 2.

The UE is configured to monitor PDCCH outside C-DRX Active Time in PCell/PSCell, the PDCCH configured to provide a DCI format that includes an indication for whether the UE is expected to monitor PDCCH for a number of next DRX cycles. A PDCCH provides a DCI format with an indication for PDCCH monitoring and can be monitored both outside and inside of C-DRX in PCell (or PSCell). When a UE detects the DCI format, the UE can interpret a field of, for example 1 bit, in the DCI format as also indicating a transition between 'dormancy' and 'non-dormancy' behaviors for active SCells.

Flowchart 1200 begins at operation 1202 when a UE receives a PDCCH-based PoSS outside of the C-DRX Active time in PCell/PSCell. In operation 1204, a determination is made as to whether the UE receives an indication to wakeup and monitor PDCCH in a next DRX ON duration. If the UE receives the indication to wakeup and monitor PDCCH in a next DRX ON duration, then the UE monitors PDCCH in the next DRX On duration in the PCell or PSCell and switches to "non-dormancy" behavior for active SCells. However, if the UE is does not receive the indication to wakeup and monitor the PDCCH in a next DRX ON duration, then the UE skips PDCCH monitoring in the next DRX ON duration in the PCell/PSCell and switches to "dormancy" behavior for active SCells.

Figure 13:
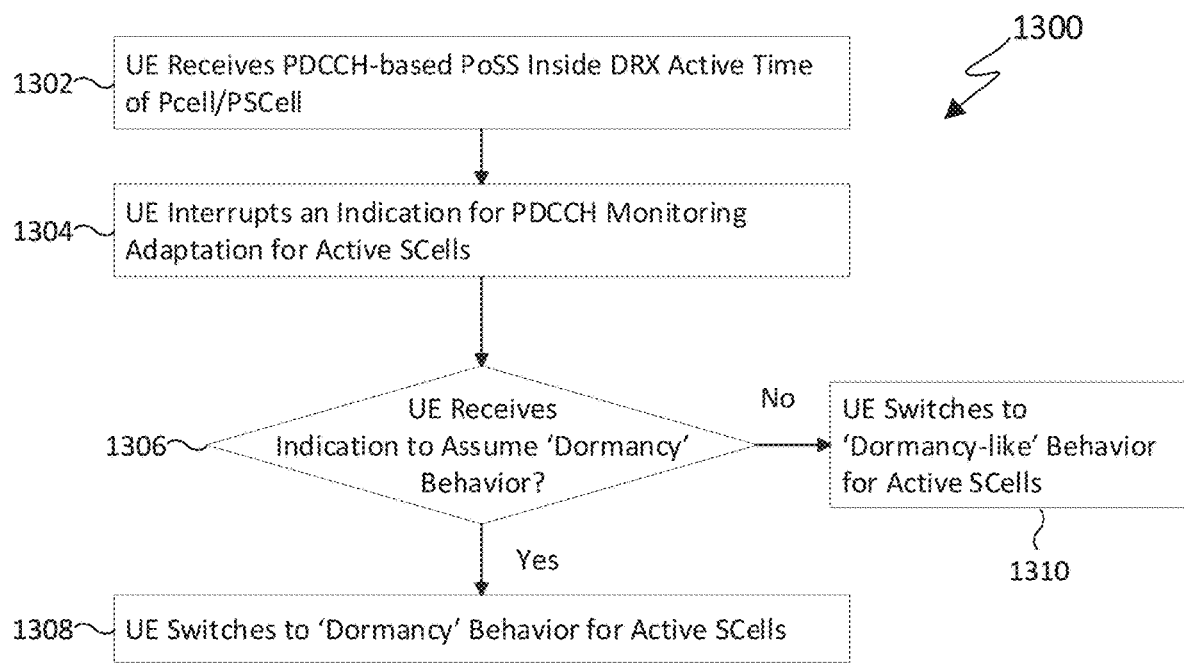
FIG. 13 illustrates another flowchart for transitioning between dormancy and non-dormancy behavior in accordance with various embodiments of this disclosure.

FIG. 13 illustrates another flowchart for transitioning between dormancy and non-dormancy behavior in active SCells in accordance with various embodiments of this disclosure. Operations of flowchart 1300 can be implemented in a UE, such as UE 116 in FIG. 2.

The UE is configured to monitor PDCCH(s) that provide(s) a DCI format with an indication of whether the UE monitors PDCCH until a next monitoring occasion of the PDCCH(s). The UE monitors the PDCCH(s) inside C-DRX Active Time or when no C-DRX is configured for the UE.

Flowchart 1300 begins in operation 1302 by receiving a PDCCH-based PoSS inside the C-DRX Active Time of the Pcell/PSCell. The UE can detect, from the PDCCH(s), the DCI format and a corresponding indication for transitioning between "dormancy" and "non-dormancy" behaviors for active SCells. In operation 1304, the UE interrupts an indication for PDCCH monitoring adaptation for active SCells. Thereafter, a determination is made in operation 1306 as to whether the UE receives an indication to assume "dormancy" behavior. If the UE receives the indication to assume "dormancy" behavior, then flowchart 1300 proceeds to operation 1308 where the UE switches to "dormancy" behavior for active SCells. However, if the UE does not receive an indication to assume "dormancy" behavior in operation 1306, then flowchart 1300 proceeds to operation 1310 where the UE switches to "dormancy-like" behavior for active SCells.

Figure 14:
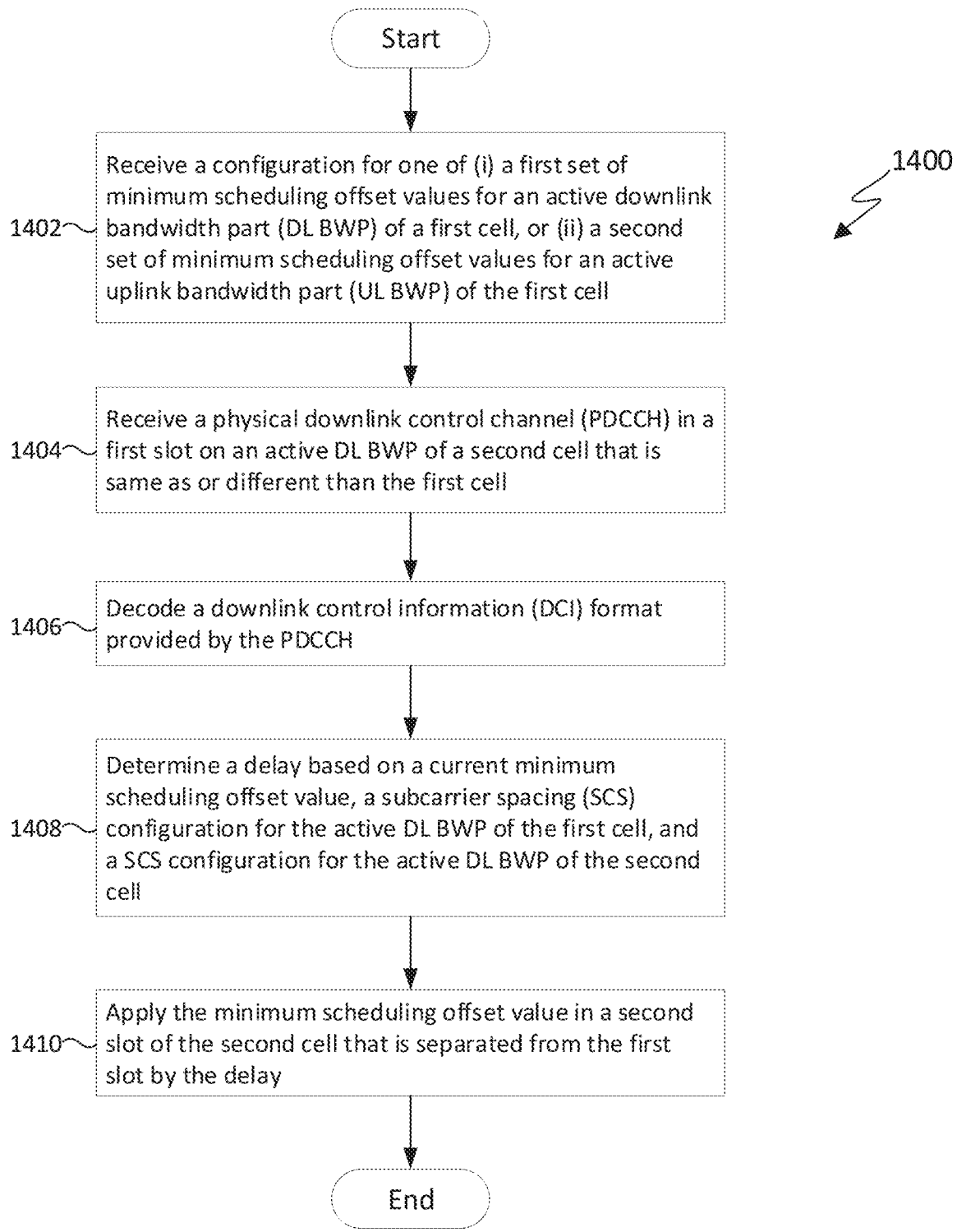
FIG. 14 illustrates a flowchart for managing scheduling offsets in accordance with various embodiments of this disclosure.

FIG. 14 illustrates a flowchart for managing scheduling offsets in accordance with various embodiments of this disclosure. Operations of flowchart 1400 can be implemented in a UE, such as UE 116 in FIG. 2.

Flowchart 1400 begins in operation 1402 by receiving an indication field that indicates a change to one or more minimum receiving a configuration for one of (i) a first set of minimum scheduling offset values for an active downlink bandwidth part (DL BWP) of a first cell, or (ii) a second set of minimum scheduling offset values for an active uplink bandwidth part (UL BWP) of the first cell.

In operation 1404, a physical downlink control channel (PDCCH) is received in a first slot on an active DL BWP of a second cell that is same as or different than the first cell.

In operation 1406, a downlink control information (DCI) format provided by the PDCCH is decoded. The DCI format includes a field that indicates a minimum scheduling offset value. In one embodiment, the minimum scheduling offset value is from the first set and is applicable for a reception of a physical downlink shared channel (PDSCH) on the active DL BWP of the first cell. In another embodiment, the minimum scheduling offset value is from the second set and is applicable for a transmission of a physical uplink shared channel (PUSCH) on the active UL BWP of the first cell.

In operation 1408, a delay is determined based on a current minimum scheduling offset value, a subcarrier spacing (SCS) configuration for the active DL BWP of the first cell, and a SCS configuration for the active DL BWP of the second cell. In a non-limiting embodiment, the delay is determined by the following equation:

$$\left\lceil Y_i * \frac{\mu^{second}}{\mu^{first}} \right\rceil,$$

where $Y_i$ is the current minimum scheduling offset of the active DL BWP in the first cell, $\mu^{first}$ is the SCS configuration for the active DL BWP of the first cell, and $\mu^{second}$ is the SCS configuration for the active DL BWP of the second cell.

In operation 1406, the minimum scheduling offset value is applied in a second slot of the second cell that is separated from the first slot by the delay.

In certain embodiments flowchart 1400 may also include additional steps of receiving a configuration for a set of serving cells and transmitting information to a gNB that includes one or more values for a minimum scheduling offset. In a non-limiting embodiment, each of the one or more values is non-zero, the one or more values correspond to respective one or more SCS configurations, and the one or more values are applicable to each cell from the set of serving cells.

In certain embodiments, flowchart 1400 can also include an optional step of applying a minimum scheduling offset value, (i.e., a default minimum scheduling offset value) before receiving the field that indicates the minimum scheduling offset from the decoded DCI format in operation 1406. indication field in operation 1402. For example, the UE can apply the lowest minimum scheduling offset value from the first set of minimum scheduling offset values and/or the second set of minimum scheduling offset values is applied when the field has a value of "0", or a PDSCH reception is not scheduled by a DCI format that includes the field, or a PUSCH transmission is not scheduled by a DCI format that includes the field.

In one embodiment, the one or more minimum scheduling offsets described in FIG. 14 is a minimum number of slots on the active DL BWP of the first cell between a slot of a PDCCH reception and a slot of a PDSCH reception that is scheduled by a DCI format provided by the PDCCH reception.

In another embodiment, the one or more minimum scheduling offsets described in FIG. 14 is a minimum number of slots on the active DL BWP of the first cell between a slot of PDCCH reception and a slot of CSI RS reception that is scheduled by a DCI format provided by the PDCCH reception.

In yet another embodiment, the one or more minimum scheduling offsets described in FIG. 14 is a minimum number of slots on the active UL BWP of the first cell between a slot of a PDCCH reception and a slot of a PUSCH transmission that is scheduled by a DCI format provided by the PDCCH reception.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A terminal, comprising:
a transceiver configured to:
receive, from a base station, configuration information including at least one minimum scheduling offset value for a downlink bandwidth part (DL BWP) or an uplink bandwidth part (UL BWP), and
receive, from the base station, a downlink control information (DCI) including a field indicating one of the at least one minimum scheduling offset value; and
a processor, operably connected to the transceiver, configured to:
apply the minimum scheduling offset value indicated by the field included in the DCI, after an application delay from a slot in which the DCI is received,
wherein the application delay is based on a value determined using a currently applied minimum scheduling offset value of an active DL BWP in a scheduled cell, a subcarrier spacing (SCS) configuration for a physical downlink control channel (PDCCH) of the active DL BWP in the scheduled cell, and a SCS configuration for a physical downlink shared channel (PDSCH) of an active DL BWP in a scheduling cell.

2. The terminal of claim 1, wherein the value is determined as:

$$\left\lceil Y_i \cdot \frac{2^{\mu^{PDCCH}}}{2^{\mu^{PDSCH}}} \right\rceil,$$

where Y is the currently applied minimum scheduling offset value of the active DL BWP in the scheduled cell, $\mu^{PDCCH}$ is the SCS configuration for the PDCCH of the active DL BWP in the scheduling cell, and $\mu^{PDSCH}$ is the SCS configuration for the PDSCH of the active DL BWP in the scheduled cell.

3. The terminal of claim 2, wherein the application delay is determined as:

$$\max\left(Y \cdot \frac{2^{\mu^{PDCCH}}}{2^{\mu^{PDSCH}}}, Z\right),$$

wherein:
Z is 1 in case that the SCS configuration of the active DL BWP in the scheduling cell corresponds to 15 kiloHertz (KHz) or 30 KHz, and
Z is 2 in case that the SCS configuration of the active DL BWP in the scheduling cell corresponds to 60 KHz or 120 KHz.

4. The terminal of claim 1, wherein the transceiver is further configured to transmit, to the base station, one or more preferred minimum scheduling offset values of the terminal.

5. The terminal of claim 1, wherein a default value is applied before the minimum scheduling offset value is applied based on the DCI including the field, the default value being one of the at least one minimum scheduling offset value included in the configuration information.

6. A base station (BS), comprising:
a processor configured to generate:
configuration information including at least one minimum scheduling offset value for a downlink bandwidth part (DL BWP) or an uplink bandwidth part (UL BWP),
a downlink control information (DCI) including a field indicating one of the at least one minimum scheduling offset value for the DL BWP or the UL BWP; and
a transceiver operably connected to the processor, the transceiver configured to transmit, to a terminal:
the configuration,
the DCI, and
wherein the minimum scheduling offset value indicated by the field included in the DCI is applied after an application delay from a slot in which the DCI is received, and
wherein the application delay is based on a value determined using a currently applied minimum scheduling offset value of an active DL BWP in a scheduled cell, a subcarrier spacing (SCS) configuration for a physical downlink control channel (PDCCH) of the active DL BWP in the scheduled cell, and a SCS configuration for a physical downlink shared channel (PDSCH) of an active DL BWP in a scheduling cell.

7. The BS of claim 6, wherein the value is determined as:

$$\left\lceil Y_i \cdot \frac{2^{\mu^{PDCCH}}}{2^{\mu^{PDSCH}}} \right\rceil,$$

where Y is the currently applied minimum scheduling offset value of the active DL BWP in the scheduled cell, $\mu^{PDCCH}$ is the SCS configuration for the PDCCH of the active DL BWP in the scheduling cell, and $\mu^{PDSCH}$ is the SCS configuration for the PDSCH of the active DL BWP in the scheduled cell.

8. The BS of claim 7, wherein the application delay is determined as:

$$\max\left(Y \cdot \frac{2^{\mu^{PDCCH}}}{2^{\mu^{PDSCH}}}, Z\right),$$

wherein:
Z is 1 in case that the SCS configuration of the active DL BWP in the scheduling cell corresponds to 15 kiloHertz (KHz) or 30 KHz, and Z is 2 in case that the SCS configuration of the active DL BWP in the scheduling cell corresponds to 60 KHz or 120 KHz.

9. The BS of claim 6, wherein the transceiver is further configured to receive, from the terminal, one or more preferred minimum scheduling offset values of the terminal.

10. The BS of claim 6, wherein a default value is applied before the minimum scheduling offset value is applied based on the DCI including the field, the default value being one of the at least one minimum scheduling offset value included in the configuration information.

11. A method performed by a terminal in a communication system, the method comprising:
receiving, from a base station, configuration information including at least one minimum scheduling offset value for a downlink bandwidth part (DL BWP) or an uplink bandwidth part (UL BWP);
receiving, from the base station, a downlink control information (DCI) including a field indicating one of the at least one minimum scheduling offset value for the DL BWP or the UL BWP; and
applying the minimum scheduling offset value indicated by the field included in the DCI, after an application delay from a slot in which the DCI is received,
wherein the application delay is based on a value determined using a currently applied minimum scheduling offset value of an active DL BWP in a scheduled cell, a subcarrier spacing (SCS) configuration for a physical downlink control channel (PDCCH) of the active DL BWP in the scheduled cell, and a SCS configuration for a physical downlink shared channel (PDSCH) of an active DL BWP in a scheduling cell.

12. The method of claim 11, wherein the value is determined as:

$$\left\lceil Y \cdot \frac{2^{\mu^{PDCCH}}}{2^{\mu^{PDSCH}}} \right\rceil,$$

where Y is the currently applied minimum scheduling offset value of the active DL BWP in the scheduled cell, $\mu^{PDCCH}$ is the SCS configuration for the PDCCH of the active DL BWP in the scheduling cell, and $\mu^{PDSCH}$ is the SCS configuration for the PDSCH of the active DL BWP in the scheduled cell.

13. The method of claim 12, wherein the application delay is determined as:

$$\max_{\square}\left(Y \cdot \frac{2^{\mu^{PDCCH}}}{2^{\mu^{PDSCH}}}, Z\right),$$

wherein:
Z is 1 in case that the SCS configuration of the active DL BWP in the scheduling cell corresponds to 15 kiloHertz (KHz) or 30 KHz, and
Z is 2 in case that the SCS configuration of the active DL BWP in the scheduling cell corresponds to 60 KHz or 120 KHz.

14. The method of claim 11, further comprising transmitting, to the base station, one or more preferred minimum scheduling offset values of the terminal.

15. The method of claim 11, wherein a default value is applied before the minimum scheduling offset value is applied based on the DCI including the field, the default value being one of the at least one minimum scheduling offset value included in the configuration information.

16. A method performed by a base station (BS) in a communication system, the method comprising:
generating:
configuration information including at least one minimum scheduling offset value for a downlink bandwidth part (DL BWP) or an uplink bandwidth part (UL BWP), and
a downlink control information (DCI) including a field indicating one of the at least one minimum scheduling offset value for the DL BWP or the UL BWP; and
transmitting, to a terminal, the configuration and the DCI,
wherein the minimum scheduling offset value indicated field included in the DCI is applied after an application delay from a slot in which the DCI is received, and
wherein the application delay is based on a value determined using a currently applied minimum scheduling offset value of an active DL BWP in a scheduled cell, a subcarrier spacing (SCS) configuration for a physical downlink control channel (PDCCH) of the active DL BWP in the scheduled cell, and a SCS configuration for a physical downlink shared channel (PDSCH) of an active DL BWP in a scheduling cell.

17. The method of claim 16, wherein the value is determined as:

$$\left\lceil Y \cdot \frac{2^{\mu^{PDCCH}}}{2^{\mu^{PDSCH}}} \right\rceil,$$

where Y is the currently applied minimum scheduling offset value of the active DL BWP in the scheduled cell, $\mu^{PDCCH}$ is the SCS configuration for the PDCCH of the active DL BWP in the scheduling cell, and $\mu^{PDSCH}$ is the SCS configuration for the PDSCH of the active DL BWP in the scheduled cell.

18. The method of claim 17, wherein the application delay is determined as:

$$\max_{\square}\left(Y \cdot \frac{2^{\mu^{PDCCH}}}{2^{\mu^{PDSCH}}}, Z\right),$$

wherein:
Z is 1 in case that the SCS configuration of the active DL BWP in the scheduling cell corresponds to 15 kiloHertz (KHz) or 30 KHz, and
Z is 2 in case that the SCS configuration of the active DL BWP in the scheduling cell corresponds to 60 KHz or 120 KHz.

19. The method of claim 16, further comprising:
receiving, from the terminal, one or more preferred minimum scheduling offset values of the terminal.

20. The method of claim 16, wherein a default value is applied before the minimum scheduling offset value is applied based on the DCI including the field, the default value being one of the at least one minimum scheduling offset value included in the configuration information.

* * * * *

UNITED STATES PATENT AND TRADEMARK OFFICE
CERTIFICATE OF CORRECTION

PATENT NO. : 11,375,518 B2
APPLICATION NO. : 16/747388
DATED : June 28, 2022
INVENTOR(S) : Qiongjie Lin and Aris Papasakellariou It is certified that error appears in the above-identified patent and that said Letters Patent is hereby corrected as shown below:

In the Claims

Claim 1, Column 29, Line 43, delete "BWP in the scheduled cell, and a SCS configuration for" and insert --BWP in a scheduling cell, and a SCS configuration for--.

Claim 1, Column 29, Line 45, delete "active DL BWP in a scheduling cell." and insert --active DL BWP in the scheduled cell.--.

Claim 6, Column 30, Line 40, delete "BWP in the scheduled cell, and a SCS configuration for" and insert --BWP in a scheduling cell, and a SCS configuration for--.

Claim 6, Column 30, Line 42, delete "active DL BWP in a scheduling cell." and insert --active DL BWP in the scheduled cell.--.

Claim 11, Column 31, Line 30, delete "BWP in the scheduled cell, and a SCS configuration for" and insert --BWP in a scheduling cell, and a SCS configuration for--.

Claim 11, Column 31, Line 32, delete "active DL BWP in a scheduling cell." and insert --active DL BWP in the scheduled cell.--.

Claim 16, Column 32, Line 24, delete "BWP in the scheduled cell, and a SCS configuration for" and insert --BWP in a scheduling cell, and a SCS configuration for--.

Claim 16, Column 32, Line 26, delete "active DL BWP in a scheduling cell." insert --active DL BWP in the scheduled cell.--.

Signed and Sealed this
Twentieth Day of February, 2024

Katherine Kelly Vidal
*Director of the United States Patent and Trademark Office*